(12) United States Patent
Nishi et al.

(10) Patent No.: US 11,974,054 B2
(45) Date of Patent: Apr. 30, 2024

(54) IMAGE SENSOR AND CAMERA HAVING HIGH SENSITIVITY AND HIGH COLOR REPRODUCIBILITY

(71) Applicant: SONY GROUP CORPORATION, Tokyo (JP)

(72) Inventors: Tomohiro Nishi, Tokyo (JP); Masatoshi Yokokawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/906,095

(22) PCT Filed: Mar. 9, 2021

(86) PCT No.: PCT/JP2021/009181
§ 371 (c)(1),
(2) Date: Sep. 12, 2022

(87) PCT Pub. No.: WO2021/187223
PCT Pub. Date: Sep. 23, 2021

(65) Prior Publication Data
US 2023/0179878 A1  Jun. 8, 2023

(30) Foreign Application Priority Data
Mar. 17, 2020  (JP) .................. 2020-046792

(51) Int. Cl.
*H04N 25/46* (2023.01)
*H04N 1/60* (2006.01)
(Continued)

(52) U.S. Cl.
CPC .............. *H04N 25/46* (2023.01); *H04N 1/60* (2013.01); *H04N 23/73* (2023.01); *H04N 23/84* (2023.01)

(58) Field of Classification Search
CPC .......... H04N 25/46; H04N 1/60; H04N 23/73; H04N 23/84; H04N 25/583; H04N 23/12; H04N 23/843; H04N 25/134
See application file for complete search history.

(56) References Cited

U.S. PATENT DOCUMENTS

| | | | |
|---|---|---|---|
| 2006/0017829 A1* | 1/2006 | Gallagher | H04N 23/843 358/525 |
| 2012/0307104 A1* | 12/2012 | Kanai | H01L 27/14627 348/E9.002 |
| 2016/0309130 A1* | 10/2016 | Onishi | H04N 23/843 |

FOREIGN PATENT DOCUMENTS

| | | |
|---|---|---|
| JP | 2007-235888 A | 9/2007 |
| JP | 2008-160210 A | 7/2008 |

(Continued)

OTHER PUBLICATIONS

International Search Report and Written Opinion of PCT Application No. PCT/JP2021/009181, dated Jun. 15, 2021, 09 pages of ISRWO.

*Primary Examiner* — Ahmed A Berhan
(74) *Attorney, Agent, or Firm* — CHIP LAW GROUP

(57) ABSTRACT

An image sensor (IS) includes a plurality of pixel blocks (PB) to which colors different from each other are assigned. Each of the plurality of pixel blocks (PB) includes a plurality of pixels (PX). The plurality of pixels PX provided in at least one pixel block (PB) among the plurality of pixel blocks (PB) includes one or more anomalous pixels (UPX). The anomalous pixel (UPX) detects light of one or more colors assigned to the other one or more pixel blocks (PB).

12 Claims, 14 Drawing Sheets

(51) Int. Cl.
*H04N 23/73* (2023.01)
*H04N 23/84* (2023.01)

(56) References Cited

FOREIGN PATENT DOCUMENTS

| | | |
|---|---|---|
| JP | 2009-010923 A | 1/2009 |
| JP | 2010-239337 A | 10/2010 |
| JP | 2015-534734 A | 12/2015 |
| JP | 2016-213740 A | 12/2016 |
| JP | 2017-055350 A | 3/2017 |
| JP | 2019-012968 A | 1/2019 |

* cited by examiner

| CENTER COLOR | RESOLUTION OF RB | BINNING MODE (FULL ADDITION) SENSITIVITY | BINNING MODE (FULL ADDITION) COLOR REPRODUCIBILITY RANGE |
|---|---|---|---|
| SINGLE COLOR | 1 | 3 | 3 |
| COMPLEMENTARY COLOR | 2 | 2 | 4 |
| ORIGINAL + ONE COLOR | 3 | 2 | 1 |
| WHITE | 4 | 1 | 2 |

IMAGE SENSOR AND CAMERA HAVING HIGH SENSITIVITY AND HIGH COLOR REPRODUCIBILITY

CROSS REFERENCE TO RELATED APPLICATIONS

This application is a U.S. National Phase of International Patent Application No. PCT/JP2021/009181 filed on Mar. 9, 2021, which claims priority benefit of Japanese Patent Application No. JP 2020-046792 filed in the Japan Patent Office on Mar. 17, 2020. Each of the above-referenced applications is hereby incorporated herein by reference in its entirety.

FIELD

The present invention relates to an image sensor and a camera.

BACKGROUND

As a method for increasing the sensitivity of an image sensor, a method called binning is known. The binning is a technique of collectively treating a plurality of adjacent pixels as one virtual pixel.

Patent Literatures 1 to 3 disclose an image sensor in which a plurality of pixel blocks is arranged in accordance with a Bayer array. Each of the pixel blocks includes a plurality of pixels arranged in a matrix. At the time of binning, detection values (pixel signals) of a plurality of the pixels belonging to the same pixel block are added and output as a total detection value of one pixel block. Demosaic processing is performed on the total detection value of each of the pixel blocks, and color information (information regarding a color value of each color) for each of the pixel blocks is estimated. In a normal mode in which the binning is not performed, the demosaic processing is performed on the detection value of each of pixels, and the color information for each pixel is estimated.

CITATION LIST

Patent Literature

Patent Literature 1: JP 2010-239337 A
Patent Literature 2: JP 2019-012968 A
Patent Literature 3: JP 2007-235888 A

SUMMARY

Technical Problem

In the pixel array in the related art, which are described above, a color sampling interval is increased according to the size of the pixel block. When the size of the pixel block increases, it becomes difficult to accurately estimate the color information of each pixel due to the demosaic processing, and there is a possibility that color reproducibility deteriorates.

Therefore, the present disclosure proposes an image sensor and a camera, which have high sensitivity and high color reproducibility.

Solution to Problem

According to the present disclosure, an image sensor and a camera are provided that comprise: a plurality of pixel blocks to which colors different from each other are assigned, wherein the plurality of pixel blocks respectively includes a plurality of pixels, and one or more anomalous pixels that detect light of one or more colors assigned to the other one or more pixel blocks are included in the plurality of pixels provided in at least one pixel block among the plurality of pixel blocks.

DESCRIPTION OF EMBODIMENTS

Figure 1:
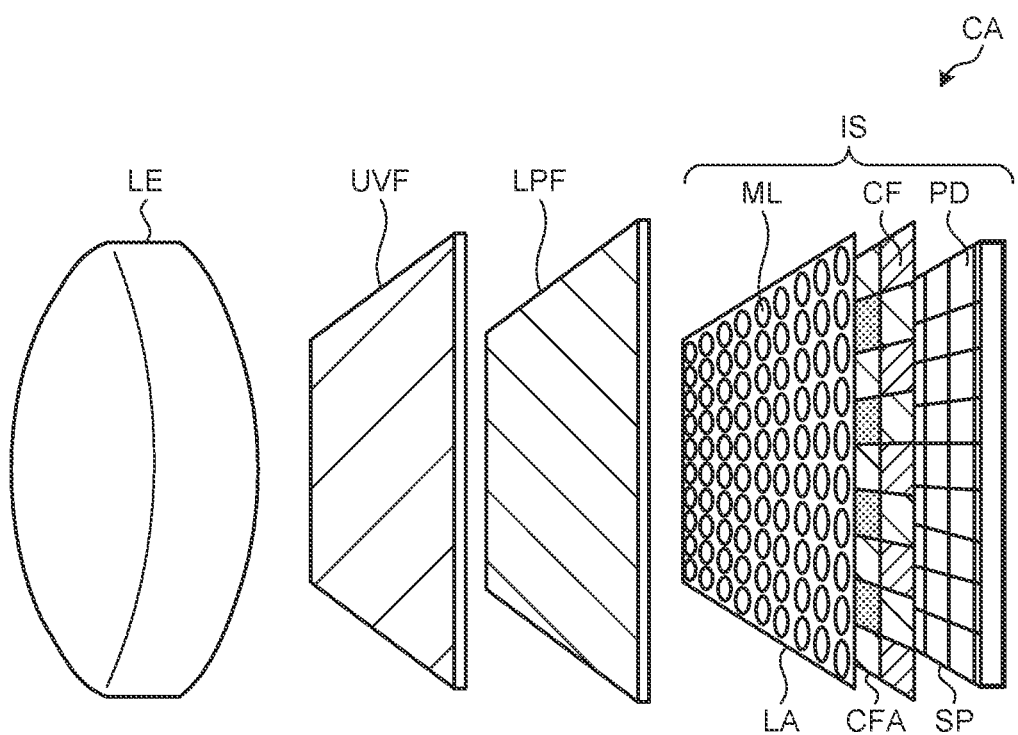
FIG. 1 is a schematic view of a camera.

Embodiments of the present disclosure will be described in detail below with reference to the drawings. In each of the following embodiments, the same parts are denoted by the same reference numerals, and an overlapped description will be omitted.

Note that, the description will be given in the following order.

[1. Configurations of Camera and Image Sensor]
[2. Image Sensor according to First Embodiment]
  [2-1. Configuration of Pixel Unit]
  [2-2. Operation In Normal Mode]
  [2-3. Operation In Binning Mode]
  [2-4. Effects]
[3. Image Sensor according to Second Embodiment]
[4. Image Sensor according to Third Embodiment]
[5. Image Sensor according to Fourth Embodiment]
[6. Image Sensor according to Fifth Embodiment]
[7. Image Sensor according to Sixth Embodiment]
[8. Image Sensor according to Seventh Embodiment]
[9. Image Sensor according to Eighth Embodiment]
[10. Variation of Arrangement of Anomalous Pixel]
[11. Another Variation of Pixel array unit]
[1. Configurations of Camera and Image Sensor]
FIG. 1 is a schematic view of a camera CA.

The camera CA includes a lens LE, a UV/IR cut filter UVF, a low-pass filter LPF, and an image sensor IS. The UV/IR cut filter UVF cuts ultraviolet light and infrared light. The low-pass filter LPF causes only light having a wavelength necessary as image information to pass and cuts other light. The low-pass filter LPF intentionally blurs an image obtained through the lens LE to suppress generation of moire and a pseudo color.

The image sensor IS converts, into an electric signal, light entering from the lens LE. The image sensor IS includes, for example, a lens array LA, a color filter array CFA, and a sensor plate SP. The sensor plate SP includes a plurality of light source conversion elements (photodiodes) PD arranged two-dimensionally. Each of the light source conversion elements PD photoelectrically converts a charge corresponding to an incident light amount, accumulates the charge inside, and outputs the charge as a signal. The color filter array CFA includes a plurality of color filters CF provided in one-to-one correspondence with a plurality of light reception elements PD. The lens array LA includes a plurality of microlenses ML that condense light incident from the lens LE onto a plurality of the light reception elements PD.

As the image sensor IS, for example, a complementary metal oxide semiconductor (CMOS) image sensor and a charge-coupled device (CCD) image sensor are used. As the color filter array CFA, for example, a primary color filter array and a complementary color filter array are used. The primary color filter array includes color filters CF of three colors of red, green, and blue. The complementary color filter array includes color filters CF of four colors of cyan, yellow, magenta, and green. In the present embodiment, the CMOS image sensor using the primary color filter array is used. The camera CA is used in a wide range of applications such as in-vehicle use.

Figure 2:
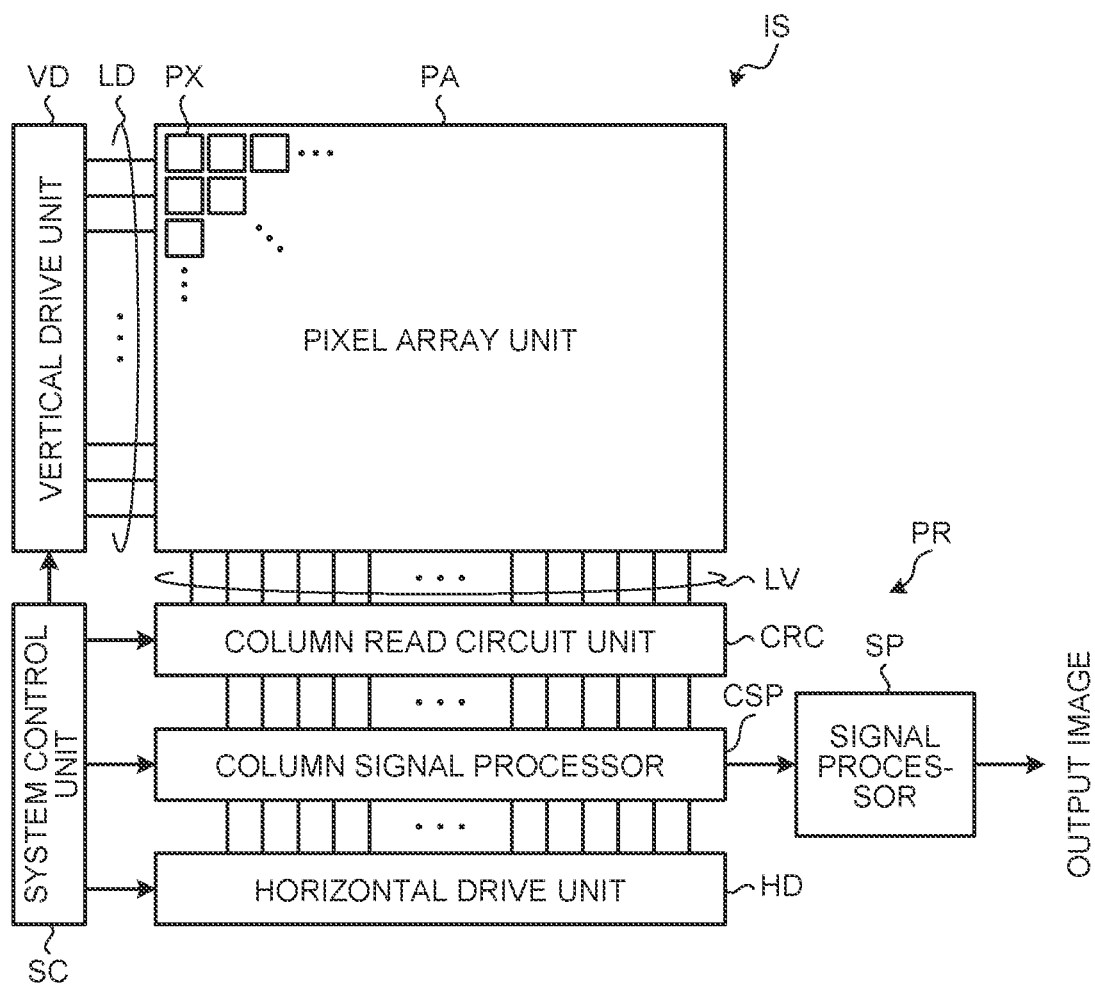
FIG. 2 is a diagram illustrating an example of a configuration of an image sensor.

FIG. 2 is a diagram illustrating an example of a configuration of the image sensor IS.

The image sensor IS includes a pixel array unit PA, a vertical drive unit VD, a column read circuit unit CRC, a column signal processor CSP, a horizontal drive unit HD, a system control unit SC, and a signal processor SP. The pixel array unit PA, the vertical drive unit VD, the column read circuit unit CRC, the column signal processor CSP, the horizontal drive unit HD, the system control unit SC, and the signal processor SP are implemented by, for example, a processing circuit PR such as an integrated circuit (IC) formed on the sensor plate SP.

The pixel array unit PA includes a plurality of pixels PX arranged two-dimensionally. Each of the pixels PX includes a photoelectric conversion element PD and a color filter CF. In the pixel array unit PA, a plurality of pixel drive lines LD extending in a horizontal direction (row direction: right and left direction in the drawing) and a plurality of vertical pixel wirings LV extending in a vertical direction (column direction: up and down direction in the drawing) are provided in a lattice shape. Each of the pixel drive lines LD is provided for each pixel row extending in the horizontal direction. Each of the vertical pixel wirings LV is provided for each pixel column extending in the vertical direction. One end of the pixel drive line LD is connected to an output terminal corresponding to each row of the vertical drive unit VD.

The column read circuit unit CRC includes at least a circuit that supplies a constant current to the pixel PX in the selected row in the pixel array unit PA for each column, a current mirror circuit, and a switching switch of the pixel PX to be read. The column read circuit unit CRC includes an amplifier together with a transistor of the selected pixel in the pixel array unit PA, converts a photoelectric charge signal into a voltage signal, and outputs the voltage signal to the vertical pixel wiring LV.

The vertical drive unit VD includes a shift register and an address decoder. The vertical drive unit VD drives each pixel PX of the pixel array unit PA in units of row. Although a specific configuration is not illustrated, the vertical drive unit VD includes a read scanning system and a sweep scanning system or a batch sweep system and a batch transfer system.

In order to read a pixel signal from the pixel PX, the read scanning system sequentially selects and scans the pixel PX of the pixel array unit PA row by row. In a case of row drive (rolling shutter operation), in the sweep operation, sweep scanning is performed on a read row on which read scanning is performed by the read scanning system, prior to the read scanning by a time corresponding to a shutter speed. Furthermore, in a case of global exposure (global shutter operation), batch sweeping is performed prior to batch transfer by the time corresponding to the shutter speed. By such sweeping, unnecessary charges are swept (reset) from the photodiode PD of the pixel PX in the read row. So-called electronic shutter operation is performed by sweeping (resetting) the unnecessary charges.

Here, the electronic shutter operation refers to an operation of discarding unnecessary photoelectric charges accumulated in the photodiode PD until immediately before the electronic shutter operation and newly starting exposure (starting accumulation of the photoelectric charges).

The signal read by the read operation of the read scanning system corresponds to an amount of light incident after the immediately preceding read operation or the electronic shutter operation. In the case of the row drive, a period from a read timing according to the immediately preceding read operation or a sweep timing according to the electronic shutter operation to a read timing according to the current read operation is a photoelectric charge accumulation time (exposure time) in the pixel PX. In the case of the global exposure, a time from the batch sweep to the batch transfer is an accumulation time (exposure time).

The pixel signal output from each pixel PX of the pixel row selectively scanned by the vertical drive unit VD is supplied to the column signal processor CSP via each of the vertical pixel wirings LV. The column signal processor CSP performs predetermined signal processing on the pixel signal output from each pixel PX of the selected row via the vertical pixel wiring LV for each pixel column of the pixel array unit PA, and temporarily holds the pixel signal after the signal processing.

Specifically, the column signal processor CSP performs at least noise removal processing, for example, correlated double sampling (CDS) processing as the signal processing. Due to CDS of the column signal processor CSP, reset noise and fixed pattern noise unique to the pixel, such as threshold variation of an amplification transistor AMP, are removed. In addition to the noise removal processing, the column signal processor CSP can be configured to have, for example, an AD conversion function and output the pixel signal as a digital signal.

The horizontal drive unit HD includes a shift register and an address decoder. The horizontal drive unit HD sequentially selects a unit circuit corresponding to the pixel column of the column signal processor CSP. In accordance with the selective scan of the horizontal drive unit HD, the pixel signal subjected to the signal processing by the column signal processor CSP is sequentially output to the signal processor SP.

The system control unit SC includes a timing generator that generates various timing signals. The system control unit SC performs drive control on the vertical drive unit VD, the column signal processor CSP, the horizontal drive unit HD, and the like based on the various timing signals generated by the timing generator.

The image sensor IS further includes the signal processor SP and a data storage unit (not illustrated). The signal processor SP has at least an addition processing function, and performs various signal processing such as addition processing on the pixel signal output from the column signal processor CSP. The data storage unit temporarily stores data necessary for signal processing in the signal processor SP. The processing of the signal processor SP and the data storage unit may be substituted by an external signal processor provided on a substrate separated from the image sensor IS, for example, a digital signal processor (DSP) or software.

[2. Image Sensor According to First Embodiment]

[2-1. Configuration of Pixel Unit]

Figure 3:
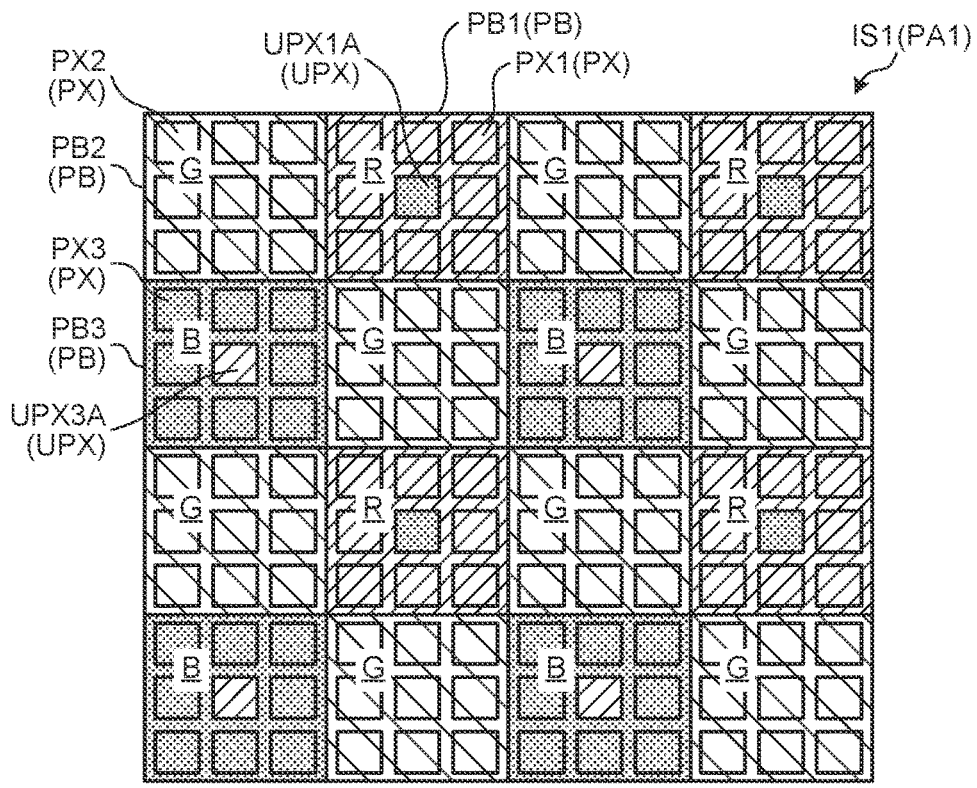
FIG. 3 is a diagram illustrating a configuration of a pixel array unit of an image sensor according to a first embodiment.

FIG. 3 is a diagram illustrating a configuration of a pixel array unit PA1 of an image sensor IS1 according to the first embodiment.

The image sensor IS1 includes a plurality of pixel blocks PB to which colors different from each other are assigned. Each of the pixel blocks PB is a pixel group including a group of pixels PX to be binned. Each of a plurality of the pixel blocks PB includes a plurality of pixels PX. "A color is assigned" means that a detection value of the pixel block PB treated as one virtual pixel in the binning mode is treated as a color value of the assigned color.

Each of a plurality of the pixel blocks PB mainly includes a plurality of the pixels PX that detect light of the assigned color. "Mainly including" means that the number of the pixels PX that detect the light of the assigned color is the greatest.

A plurality of the pixels PX provided in at least one pixel block PB among a plurality of the pixel blocks PB include one or more anomalous pixels UPX. The anomalous pixel UPX is a pixel PX that detects light of one or more colors assigned to the other one or more pixel blocks PB to which the anomalous pixel UPX does not belong.

In the example of FIG. 3, a plurality of the pixel blocks PB include a red pixel block PB1 to which red is assigned, a green pixel block PB2 to which green is assigned, and a blue pixel block PB3 to which blue is assigned. The red pixel block PB1, the green pixel block PB2, and the blue pixel block PB3 are arranged according to a Bayer array pattern.

Each of a plurality of the pixel blocks PB includes, for example, $N^2$ pixels PX arranged in N rows and N columns (N is an integer greater than or equal to 3) in the horizontal direction and the vertical direction. In the example of FIG. 3, each of the pixel blocks PB includes nine pixels PX arranged in three rows and three columns (N=3).

The red pixel block PB1 includes, for example, one anomalous pixel UPX1A. The anomalous pixel UPX1A is located, for example, at the center of the red pixel block PB1. The anomalous pixel UPX1A detects, for example, blue light assigned to the blue pixel block PB3. The blue pixel block PB3 includes, for example, one anomalous pixel UPX3A. The anomalous pixel UPX3A is located, for example, at the center of the blue pixel block PB3. The anomalous pixel UPX3A detects, for example, red light assigned to the red pixel block PB1. The green pixel block PB2 does not include an anomalous pixel UPX. The number of anomalous pixels UPX included in one pixel block PB may be two or more.

[2-2. Operation in Normal Mode]

The signal processor SP performs demosaic processing on a detection value of each pixel PX. The demosaic processing is processing of complementing missing color information for each pixel PX based on the detection values of surrounding pixels PX. The demosaic processing can be performed by various known methods. As a simple method, there is a method of performing linear interpolation with the detection values of a plurality of the pixels PX corresponding to the same colors in the vicinity. The color information of each pixel PX may be estimated using a machine learning method. For example, the signal processor SP can estimate the color value of each color for each pixel PX from the detection value of each pixel PX by using an analysis model obtained by performing the machine learning on a relationship between the known luminance distribution and the detection value of each pixel PX.

The red pixel block PB1 includes the anomalous pixel UPX1A that detects a blue color. The blue pixel block PB3 includes the anomalous pixel UPX3A that detects a red color. Therefore, the sampling intervals for the red and blue are reduced. Accordingly, the color information of each pixel PX is accurately calculated by the demosaic processing. As a result, the color reproducibility is enhanced in the normal mode.

[2-3. Operation in Binning Mode]

The signal processor SP treats the pixel block PB as one virtual pixel. The signal processor SP detects the detection values of a plurality of the pixel blocks PB as color values of colors assigned to a plurality of the pixel blocks PB, and performs demosaic processing. Since a plurality of the pixels PX are collectively treated as one virtual pixel, the detection sensitivity is increased. As a result, an image with less noise can be captured even in a dark environment.

For example, the signal processor SP adds detection values of a plurality of the pixels PX in the same pixel block PB including one or more anomalous pixels UPX. The signal processor SP performs color correction on the total detection value obtained by the addition by using a linear matrix of the following Formula (1). The color correction is processing of correcting a color shift caused by adding the detection value of the anomalous pixel UPX to the detection value of another pixel PX. The signal processor SP detects the total detection value subjected to the color correction as a color value of color assigned to the pixel block PB, and performs demosaic processing.

$$\begin{pmatrix} R' \\ G' \\ B' \end{pmatrix} = \begin{pmatrix} Rr & Rg & Rb \\ Gr & Gg & Gb \\ Br & Bg & Bb \end{pmatrix} \begin{pmatrix} R \\ G \\ B \end{pmatrix} \quad (1)$$

In Formula (1), R, G, and B are the total detection values of the red pixel block PB1, the green pixel block PB2, and the blue pixel block PB3. R', G', and B' are the corrected color values of the red pixel block PB1, the green pixel block PB2, and the blue pixel block PB3. A coefficient (Rr, Rg, Rb, Gr, Gg, Gb, Br, Bg, Bb) of the linear matrix is determined by spectral transmittance of the color filter CF and an area ratio between an anomalous pixel region (region where the anomalous pixel UPX is disposed) and a non-anomalous pixel region (region where a plurality of the pixels PX other than the anomalous pixel UPX is disposed) in one pixel block PB.

In order to suppress the color shift caused by the anomalous pixel UPX, the signal processor SP may not add the detection value of the anomalous pixel UPX to the detection values of the other pixels PX. For example, the signal processor SP adds the detection values of a plurality of the pixels PX in the same pixel block PB excluding one or more anomalous pixels UPX. The signal processor SP detects the total detection value obtained by the addition as the color value of color assigned to the pixel block PB, and performs demosaic processing.

[2-4. Effects]

The image sensor IS1 includes a plurality of pixel blocks PB to which colors different from each other are assigned. Each of a plurality of the pixel blocks PB includes a plurality of the pixels PX. A plurality of the pixels PX provided in at least one pixel block PB among a plurality of the pixel blocks PB include one or more anomalous pixels UPX. One or more anomalous pixels UPX detect light of one or more colors assigned to the other one or more pixel blocks PB, respectively. The camera CA includes the image sensor IS1 described above.

In this configuration, the sampling intervals for colors are reduced. Therefore, the color information of each pixel PX is accurately calculated by the demosaic processing. The color reproducibility is enhanced in the normal mode in which the binning is not performed. Accordingly, the image sensor IS1 and the camera CA, which have high sensitivity and high color reproducibility, are provided.

The image sensor IS1 includes, for example, a processing circuit PR. The processing circuit PR detects each of the detection values of a plurality of the pixel blocks PB as a color value of color assigned to each of a plurality of the pixel blocks PB, for example, in the binning mode.

In this configuration, the pixel block PB is treated as one virtual pixel, and thus the detection sensitivity is increased. As a result, an image with less noise is captured even in a dark environment.

The processing circuit PR adds detection values of a plurality of the pixels PX in the same pixel block PB including one or more anomalous pixels UPX, for example, in the binning mode. For example, the processing circuit PR performs color correction on the total detection value obtained by the addition. The processing circuit PR detects the total detection value subjected to the color correction as a color value of color assigned to the pixel block PB.

In this configuration, color reproducibility in the binning mode is enhanced.

The processing circuit PR adds detection values of a plurality of the pixels PX in the same pixel block PB excluding one or more anomalous pixels UPX, for example, in the binning mode. The processing circuit PR detects the total detection value obtained by the addition as a color value of color assigned to the pixel block PB.

In this configuration, color reproducibility in the binning mode is enhanced.

Each of a plurality of the pixel blocks PB includes, for example, $N^2$ pixels PX arranged in N rows and N columns (N is an integer greater than or equal to 3).

In this configuration, high sensitivity is obtained in the binning mode.

For example, a plurality of the pixel blocks PB include a red pixel block PB1 to which red is assigned, a green pixel block PB2 to which green is assigned, and a blue pixel block PB3 to which blue is assigned. For example, the red pixel block PB1, the green pixel block PB2, and the blue pixel block PB3 are arranged according to a Bayer array pattern.

In this configuration, the resolution of green is high, and thus the visual resolution is increased.

[3. Image Sensor According to Second Embodiment]

Figure 4:
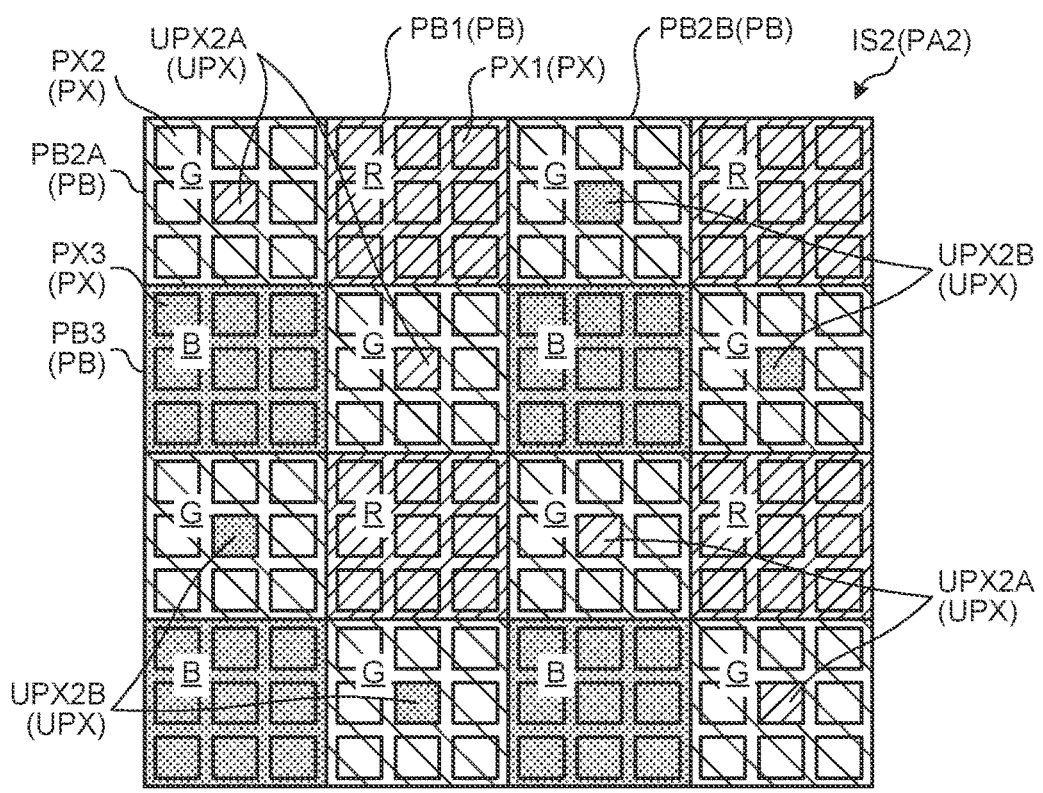
FIG. 4 is a diagram illustrating a configuration of a pixel array unit of an image sensor according to a second embodiment.

FIG. 4 is a diagram illustrating a configuration of a pixel array unit PA2 of an image sensor IS2 according to the second embodiment. The present embodiment is different from the first embodiment in that the anomalous pixel UPX is provided only in the green pixel block PB2. The red pixel block PB1 and the blue pixel block PB3 do not include the anomalous pixel UPX. Hereinafter, the difference from the first embodiment will be mainly described.

For example, the image sensor IS2 includes a first green pixel block PB2A and a second green pixel block PB2B, as the green pixel block PB2. The first green pixel block PB2A includes, for example, one anomalous pixel UPX2A. The anomalous pixel UPX2A is located, for example, at the center of the first green pixel block PB2A. The anomalous pixel UPX2A detects, for example, red light assigned to the red pixel block PB1. The second green pixel block PB2B includes, for example, one anomalous pixel UPX2B. The anomalous pixel UPX2B is located, for example, at the center of the second green pixel block PB2B. The anomalous pixel UPX2B detects, for example, blue light assigned to the blue pixel block PB3. The first green pixel block PB2A and the second green pixel block PB2B are, for example, alternately arranged in the horizontal direction and the vertical direction. The number of anomalous pixels UPX included in one pixel block PB may be two or more.

In the present embodiment, the sampling intervals for the red and blue are reduced. Accordingly, the color information of each pixel PX is accurately calculated by the demosaic processing. As a result, the color reproducibility is enhanced in the normal mode.

[4. Image Sensor According to Third Embodiment]

Figure 5:
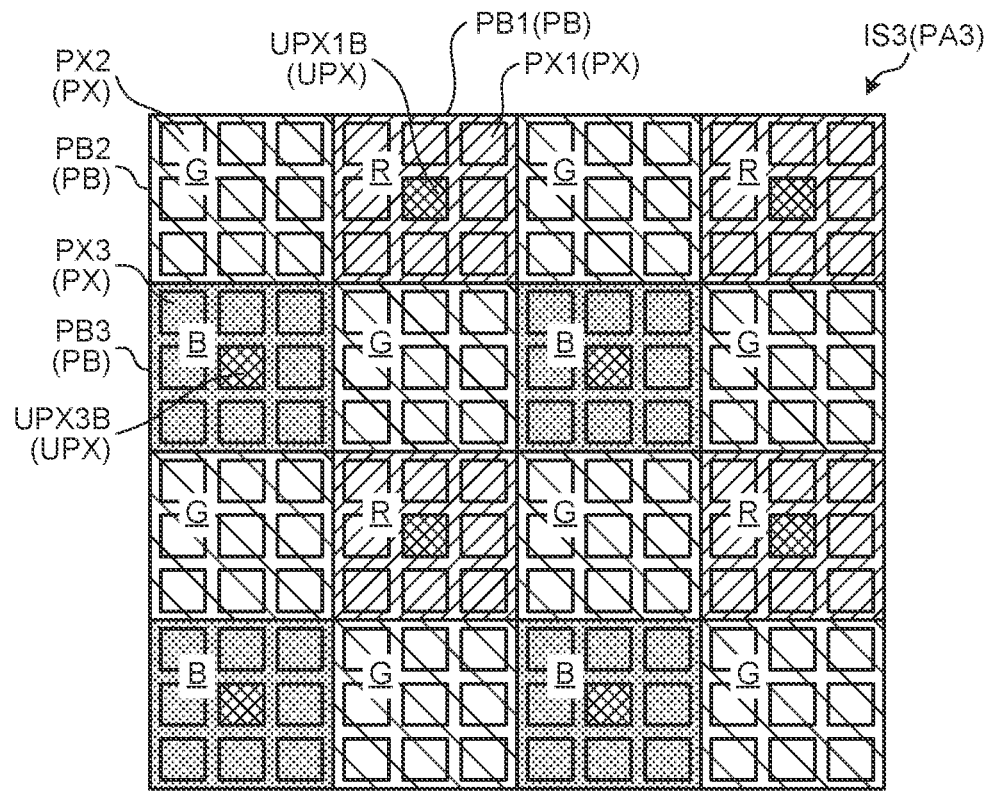
FIG. 5 is a diagram illustrating a configuration of a pixel array unit of an image sensor according to a third embodiment.

FIG. 5 is a diagram illustrating a configuration of a pixel array unit PA3 of an image sensor IS3 according to the third embodiment. The present embodiment is different from the first embodiment in that the anomalous pixel UPX detects light of two or more colors selected from a plurality of colors assigned to a plurality of the pixel blocks PB. The anomalous pixel UPX selectively detects, for example, light of a color assigned to the pixel block PB to which the anomalous pixel UPX belongs and light of a color assigned to the pixel block PB to which the anomalous pixel UPX does not belong. Hereinafter, the difference from the first embodiment will be mainly described.

The red pixel block PB1 includes, for example, one anomalous pixel UPX1B. The anomalous pixel UPX1B is located, for example, at the center of the red pixel block PB1. The anomalous pixel UPX1B detects, for example, light of a red color assigned to the red pixel block PB1 and light of a blue color assigned to the blue pixel block PB3. The blue pixel block PB3 includes, for example, one anomalous pixel UPX3B. The anomalous pixel UPX3B is located, for example, at the center of the blue pixel block PB3. The anomalous pixel UPX3B detects, for example, light of a red color assigned to the red pixel block PB1 and light of a blue color assigned to the blue pixel block PB3. The green pixel block PB2 does not include an anomalous pixel UPX. The number of anomalous pixels UPX included in one pixel block PB may be two or more. The number of colors detected by the anomalous pixel UPX may be more than two.

The anomalous pixel UPX detects light of two or more colors. Therefore, for example, a signal processor SA estimates each of the color values of two or more colors detected by the anomalous pixel UPX by using the color information of the pixels PX around the anomalous pixel UPX. For example, the signal processor SA estimates the color value of red to be detected by the anomalous pixel UPX1B based on the detection value of the pixel PX other than the anomalous pixel UPX1B in the red pixel block PB1. The signal processor SA estimates the color value of blue to be detected by the anomalous pixel UPX1B by subtracting the estimated color value of red from the detection value (including the color value of red and the color value of blue) of the anomalous pixel UPX1B. The color value of red and the color value of blue to be detected by the anomalous pixel UPX3B are also estimated by a similar method.

In the present embodiment, light of two or more colors are detected by one anomalous pixel UPX. Therefore, the sampling intervals for two or more colors are reduced. The sensitivity in the binning mode is also increased. Furthermore, the anomalous pixel UPX detects light of two or more colors including the color assigned to the pixel block PB to which the anomalous pixel UPX belongs. Therefore, the color reproducibility in the normal mode is high.

The anomalous pixel UPX detects light of two or more colors. Therefore, the pixel signal is likely to be saturated as compared with other pixels PX that detect only light of one color. Therefore, for example, the processing circuit PR makes the exposure time of the anomalous pixel UPX shorter than the exposure time of other pixels PX.

Figure 6:
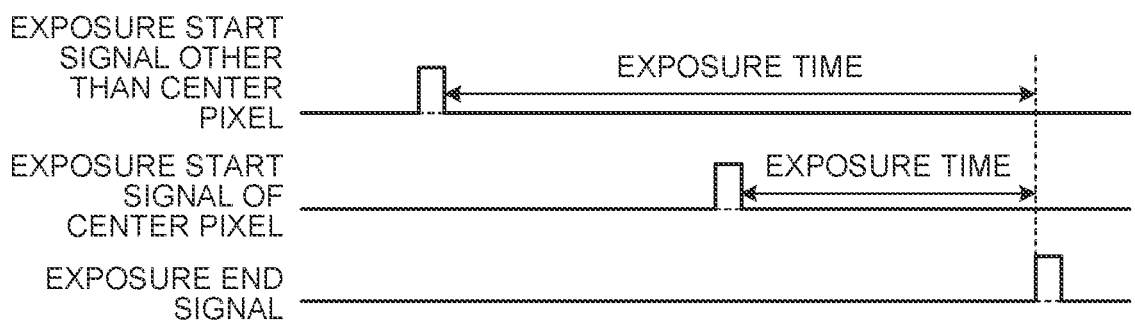
FIG. 6 is a diagram illustrating an exposure timing of each pixel.

FIG. 6 is a diagram illustrating an exposure timing of each pixel PX.

An exposure start timing of the anomalous pixel UPX at the center of the pixel block PB is later than the exposure start timing of the pixels PX other than the anomalous pixel UPX. An exposure end timing is the same as that of the anomalous pixel UPX and the pixels PX other than the anomalous pixel UPX. Therefore, the exposure time of the anomalous pixel UPX is shorter than the exposure time of the pixels PX other than the anomalous pixel UPX. The exposure time of the anomalous pixel UPX is set to, for example, half the exposure time of the pixels PX other than the anomalous pixel UPX. Therefore, the pixel signal of the anomalous pixel UPX is prevented from being saturated.

[5. Image Sensor According to Fourth Embodiment]

Figure 7:
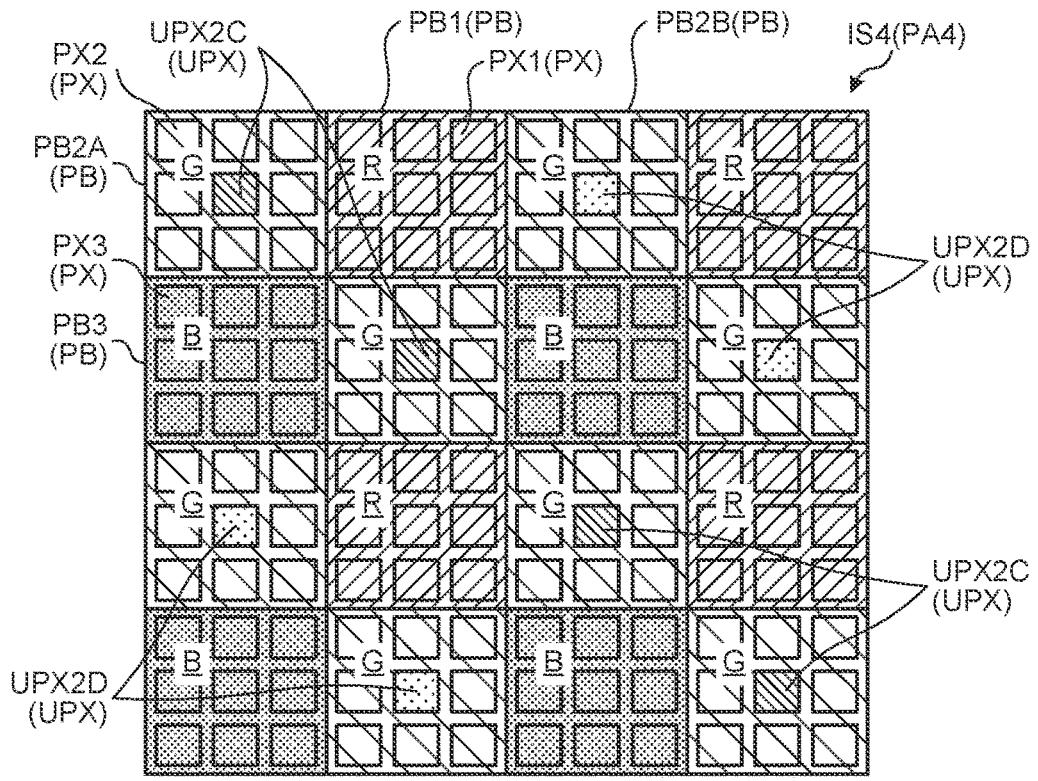
FIG. 7 is a diagram illustrating a configuration of a pixel array unit of an image sensor according to a fourth embodiment.

FIG. 7 is a diagram illustrating a configuration of a pixel array unit PA4 of an image sensor IS4 according to the fourth embodiment. The present embodiment is different from the second embodiment in that the anomalous pixel UPX detects light of two or more colors selected from a plurality of colors assigned to a plurality of the pixel blocks PB. The anomalous pixel UPX selectively detects, for example, light of a color assigned to the pixel block PB to which the anomalous pixel UPX belongs and light of a color assigned to the pixel block PB to which the anomalous pixel UPX does not belong. Hereinafter, the difference from the second embodiment will be mainly described.

The first green pixel block PB2A includes, for example, one anomalous pixel UPX2C. The anomalous pixel UPX2C is located, for example, at the center of the first green pixel block PB2A. The anomalous pixel UPX2C detects, for example, light of a red color assigned to the red pixel block PB1 and light of a green color assigned to the green pixel block PB2. The second green pixel block PB2B includes, for example, one anomalous pixel UPX2D. The anomalous pixel UPX2D is located, for example, at the center of the second green pixel block PB2B. The anomalous pixel UPX2D detects, for example, light of a green color assigned to the green pixel block PB2 and light of a blue color assigned to the blue pixel block PB3. The first green pixel block PB2A and the second green pixel block PB2B are, for example, alternately arranged in the horizontal direction and the vertical direction. The number of anomalous pixels UPX included in one pixel block PB may be two or more.

The anomalous pixel UPX detects light of two or more colors. Therefore, for example, a signal processor SA estimates each of the color values of two or more colors detected by the anomalous pixel UPX by using the color information of the pixels PX around the anomalous pixel UPX. For example, the signal processor SA estimates the color value of green to be detected by the anomalous pixel UPX2C based on the detection value of the pixel PX other than the anomalous pixel UPX2C in the first green pixel block PB2A. The signal processor SA estimates the color value of red to be detected by the anomalous pixel UPX2C by subtracting the estimated color value of green from the detection value (including the color value of red and the color value of green) of the anomalous pixel UPX2C. The color value of green and the color value of blue to be detected by the anomalous pixel UPX2D are also estimated by a similar method.

For example, the processing circuit PR makes the exposure time of the anomalous pixel UPX shorter than the exposure time of other pixels PX. According to this, the pixel signal of the anomalous pixel UPX is prevented from being saturated.

In the present embodiment, light of two or more colors are detected by one anomalous pixel UPX. Therefore, the sampling intervals for two or more colors are reduced. The sensitivity in the binning mode is also increased. Furthermore, the anomalous pixel UPX detects light of two or more colors including the color assigned to the pixel block PB to which the anomalous pixel UPX belongs. Therefore, the color reproducibility in the normal mode is high.

[6. Image Sensor According to Fifth Embodiment]

Figure 8:
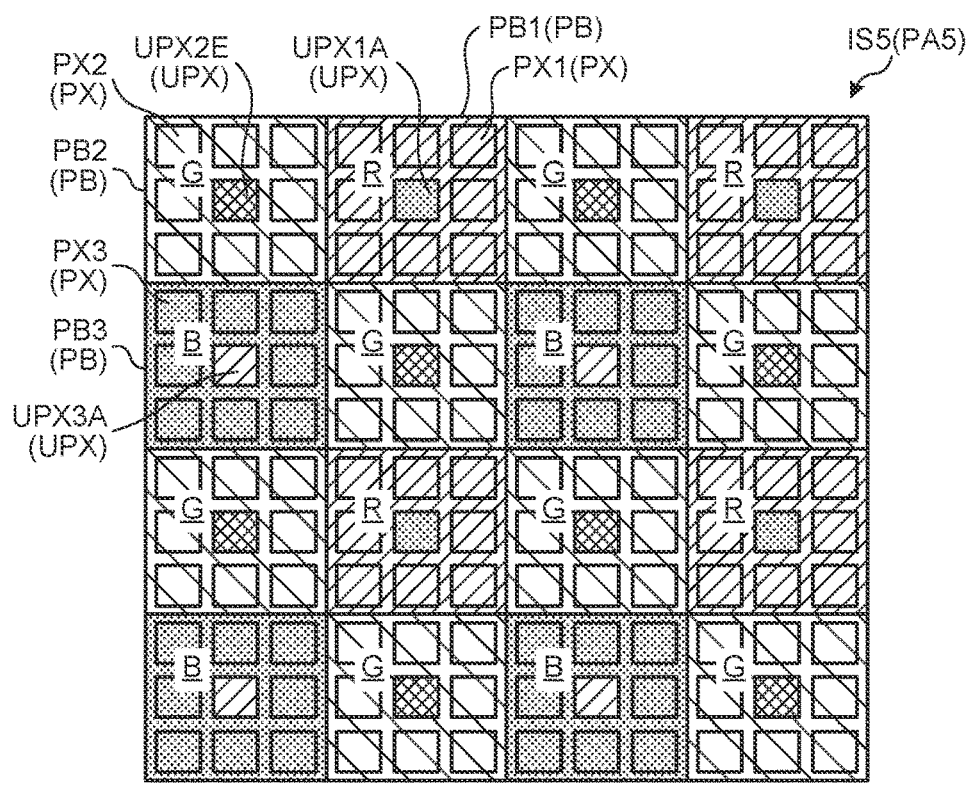
FIG. 8 is a diagram illustrating a configuration of a pixel array unit of an image sensor according to a fifth embodiment.

FIG. 8 is a diagram illustrating a configuration of a pixel array unit PA5 of an image sensor IS5 according to the fifth embodiment. The present embodiment is different from the first embodiment in that the anomalous pixel UPX is provided in the green pixel block PB2 in addition to the red pixel block PB1 and the blue pixel block PB3. All the pixel blocks PB include one or more anomalous pixels UPX. For example, an anomalous pixel UPX2E provided in the green pixel block PB2 detects light of two or more colors selected from a plurality of colors assigned to a plurality of the pixel blocks PB. The anomalous pixel UPX2E, for example, selectively detects light of two or more colors each assigned to two or more pixel blocks PB to which the anomalous pixel UPX does not belong. Hereinafter, the difference from the first embodiment will be mainly described.

The green pixel block PB2 includes, for example, one anomalous pixel UPX2E. The anomalous pixel UPX2E is located, for example, at the center of the green pixel block PB2. The anomalous pixel UPX2E detects, for example, light of a red color assigned to the red pixel block PB1 and light of a blue color assigned to the blue pixel block PB3. The anomalous pixel UPX2E detects light of a magenta color having a complementary color relationship with the green color assigned to the green pixel block PB2 to which the anomalous pixel UPX2E belongs. The number of the anomalous pixels UPX2E included in one green pixel block PB2 may be two or more. The number of colors detected by the anomalous pixel UPX2E may be more than two.

The anomalous pixel UPX2E detects light of two or more colors. Therefore, for example, the signal processor SA estimates each of the color values of two or more colors detected by the anomalous pixel UPX2E by using the color information of the pixels PX around the anomalous pixel UPX2E. For example, the signal processor SA estimates a color value of red and a color value of blue to be detected by the anomalous pixel UPX2E based on the detection values of the red pixel PX and the blue pixel PX, which are detected by the red pixel block PB1 and the blue pixel block PB3 around the green pixel block PB2.

For example, the signal processor SA can estimate the color value of red and the color value of blue of each pixel PX in the green pixel block PB2 with high accuracy by comparing the sum of the estimated color value of red and the estimated color value of blue with the detection value (including the color value of red and the color value of blue). The color information of the other pixels PX can be estimated based on the surrounding color information having high accuracy.

Figure 9:
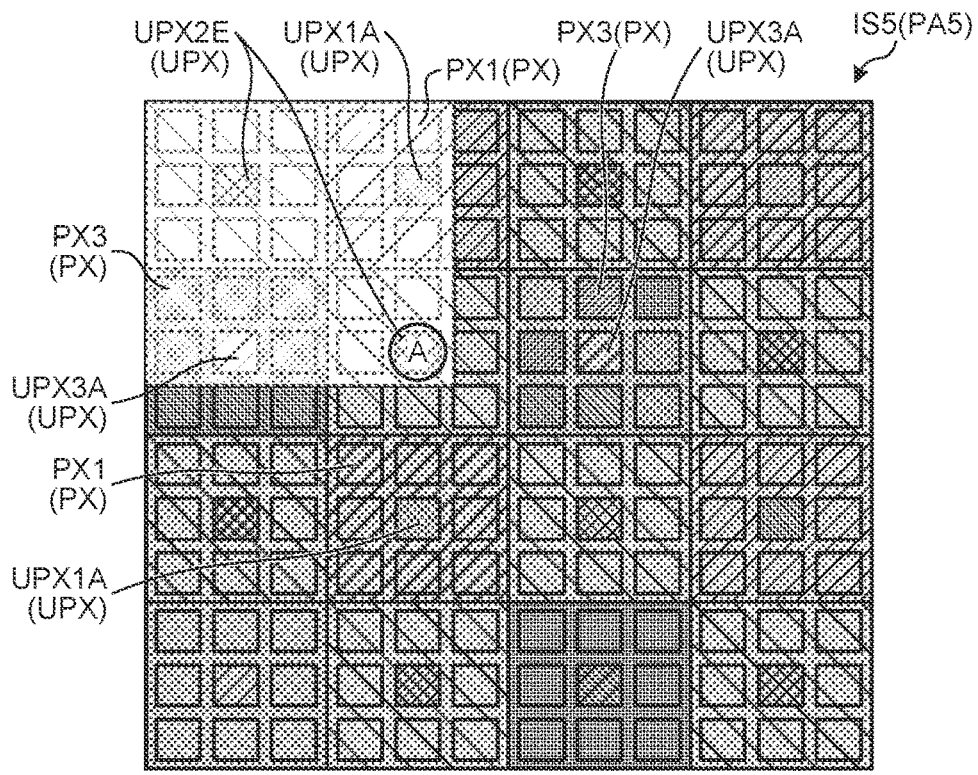
FIG. 9 is a diagram illustrating an example of a method of estimating color information.

FIG. 9 is a diagram illustrating an example of a method of estimating color information.

FIG. 9 illustrates a state in which white light is incident on a part of the pixel array unit PA5. The white light is measured as light having a color value of 128 for each of red, green, and blue. The color values of red, green, and blue in the dark portion are all zero. At this time, the color values of red, green, and blue of the anomalous pixel UPX2E indicated by "A" in the drawing are estimated as follows.

First, detection values for red and blue around the anomalous pixel UPX2E are acquired. In the example of FIG. 9, both the color value of red and the color value of blue of the pixel PX above the anomalous pixel UPX2E are 128. Both the color value of red and the color value of blue of the pixel PX on the left of the anomalous pixel UPX2E are 128. Both the color value of red and the color value of blue of the pixel PX on the right of the anomalous pixel UPX2E are zero. Both the color value of red and the color value of blue of the pixel PX below the anomalous pixel UPX2E are zero.

When linear interpolation is performed using the detection values of red and blue around the anomalous pixel UPX2E, both the color values of red and blue of the anomalous pixel UPX2E are estimated to be 64. Therefore, the detection value (the sum of the color value of red and the color value of blue) of the anomalous pixel UPX2E is estimated to be 128. However, the actual detection value of the anomalous pixel UPX2E is 256 (the sum of the color value of red of 128 and the color value of blue of 128). It is found that the estimated color values of red and blue are to be modified to larger values. Accordingly, for example, the signal processor SP performs processing of increasing or decreasing the estimated color value of red and the estimated color value of blue such that the sum of the estimated color value of red and the estimated color value of blue becomes the same value as the actual detection value (the sum of the color value of red and the color value of blue) while maintaining the ratio between the estimated color value of red and the estimated color value of blue. Note that estimation and correction of the color value may be performed using a machine learning method.

For example, the processing circuit PR makes the exposure time of the anomalous pixel UPX2E shorter than the exposure time of other pixels PX. Therefore, the pixel signal of the anomalous pixel UPX2E is prevented from being saturated.

In the present embodiment, all the pixel blocks PB include one or more anomalous pixels UPX. Therefore, the sampling interval is reduced for all the colors assigned to a plurality of the pixel blocks PB. The sensitivity in the binning mode is also increased. Furthermore, since the anomalous pixel UPX2E that detects red light and blue light is provided in the green pixel block PB2, the resolution of red and blue is increased. Furthermore, the anomalous pixel UPX2E selectively detects light of two or more colors each assigned to two or more pixel blocks PB to which the anomalous pixel UPX2E does not belong. Therefore, in the normal mode, the estimation accuracy of the color values of the two or more colors in the anomalous pixel UPX2E is enhanced.

[7. Image Sensor According to Sixth Embodiment]

Figure 10:
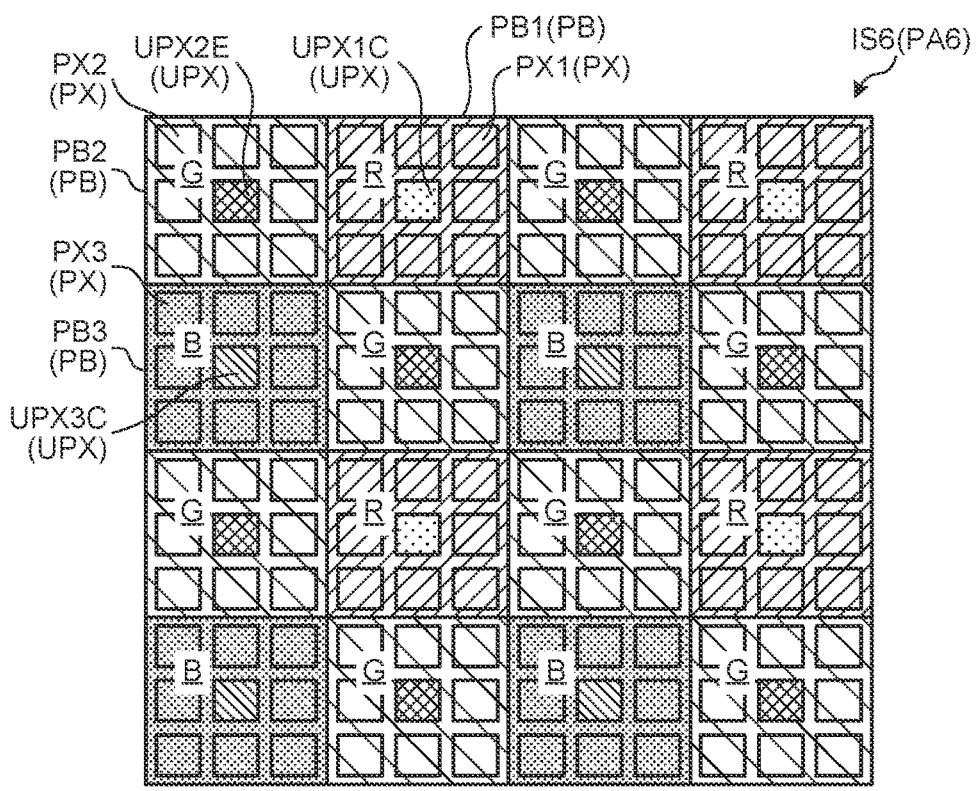
FIG. 10 is a diagram illustrating a configuration of a pixel array unit of an image sensor according to a sixth embodiment.

FIG. 10 is a diagram illustrating a configuration of a pixel array unit PA6 of an image sensor IS6 according to the sixth embodiment. The present embodiment is different from the fifth embodiment in that the anomalous pixels UPX of the red pixel block PB1 and the blue pixel block PB3 detect light of two or more colors selected from a plurality of colors assigned to a plurality of the pixel blocks PB. The anomalous pixels UPX of the red pixel block PB1 and the blue pixel block PB3, for example, selectively detect light of two or more colors each assigned to two or more pixel blocks PB to which the anomalous pixel UPX does not belong. Hereinafter, the difference from the fifth embodiment will be mainly described.

The red pixel block PB1 includes, for example, one anomalous pixel UPX1C. The anomalous pixel UPX1C is located, for example, at the center of the red pixel block PB1. The anomalous pixel UPX1C detects, for example, light of a green color assigned to the green pixel block PB2 and light of a blue color assigned to the blue pixel block PB3. The anomalous pixel UPX1C detects light of a cyan color having a complementary color relationship with the red color assigned to the red pixel block PB1 to which the anomalous pixel UPX1C belongs. The number of the anomalous pixel UPX1C included in one red pixel block PB1 may be two or more. The number of colors detected by the anomalous pixel UPX1C may be more than two.

The blue pixel block PB3 includes, for example, one anomalous pixel UPX3C. The anomalous pixel UPX3C is located, for example, at the center of the blue pixel block PB3. The anomalous pixel UPX3C detects, for example, light of a red color assigned to the red pixel block PB1 and light of a green color assigned to the green pixel block PB2. The anomalous pixel UPX3C detects light of a yellow color having a complementary color relationship with the blue color assigned to the blue pixel block PB3 to which the anomalous pixel UPX3C belongs. The number of the anomalous pixels UPX3C included in one blue pixel block PB3 may be two or more. The number of colors detected by the anomalous pixel UPX3C may be more than two.

The anomalous pixel UPX1C detects light of two or more colors. Therefore, for example, the signal processor SA estimates each of the color values of two or more colors detected by the anomalous pixel UPX1C by using the color information of the pixels PX around the anomalous pixel UPX1C. For example, the signal processor SA estimates the color value of green and the color value of blue to be detected by the anomalous pixel UPX1C based on the detection values of the green pixel PX and the blue pixel PX, which are detected by the green pixel block PB2 and the blue pixel block PB3 around the red pixel block PB1.

For example, the signal processor SA can estimate the color value of green and the color value of blue of each pixel PX in the red pixel block PB1 with high accuracy by comparing the sum of the estimated color value of green and the estimated color value of blue with the detection value (including the color value of green and the color value of blue). The color information of the other pixels PX can be estimated based on the surrounding color information having high accuracy.

The anomalous pixel UPX3C detects light of two or more colors. Therefore, for example, the signal processor SA estimates each of the color values of two or more colors detected by the anomalous pixel UPX3C by using the color information of the pixels PX around the anomalous pixel UPX3C. For example, the signal processor SA estimates the color value of red and the color value of green to be detected by the anomalous pixel UPX3C based on the detection values of the red pixel PX and the green pixel PX, which are detected by the red pixel block PB1 and the green pixel block PB2 around the blue pixel block PB3.

For example, the signal processor SA can estimate the color value of red and the color value of green of each pixel PX in the blue pixel block PB3 with high accuracy by comparing the sum of the estimated color value of red and the estimated color value of green with the detection value (including the color value of red and the color value of green). The color information of the other pixels PX can be estimated based on the surrounding color information having high accuracy.

In the present embodiment, the following effects are obtained in addition to the effects of the fifth embodiment. Since the anomalous pixel UPX1C that detects green and blue light is provided in the red pixel block PB1, the resolution of green and blue is increased. Since the anomalous pixel UPX3C that detects red and green light is provided in the blue pixel block PB3, the resolution of red and green is increased. Furthermore, the anomalous pixel UPX1C selectively detects light of two or more colors each assigned to two or more pixel blocks PB to which the anomalous pixel UPX1C does not belong. Therefore, in the normal mode, the estimation accuracy for the color values of the two or more colors in the anomalous pixel UPX1C is enhanced. The anomalous pixel UPX3C selectively detects light of two or more colors each assigned to two or more pixel blocks PB to which the anomalous pixel UPX3C does not belong. Therefore, in the normal mode, the estimation accuracy for the color values of the two or more colors in the anomalous pixel UPX3C is enhanced.

[8. Image Sensor According to Seventh Embodiment]

Figure 11:
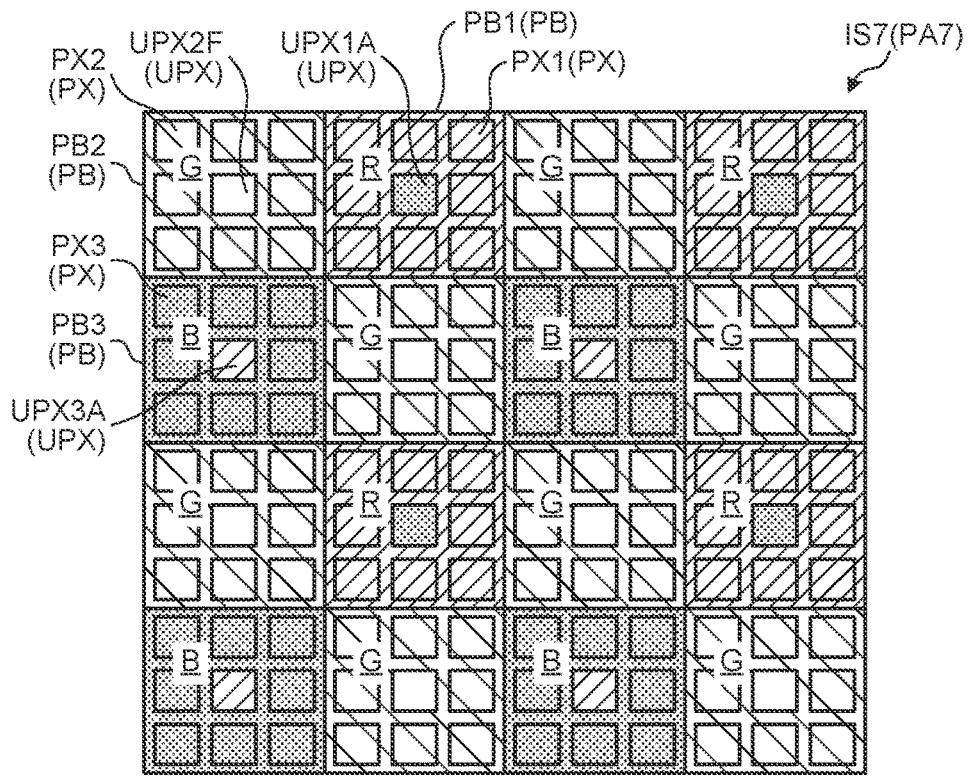
FIG. 11 is a diagram illustrating a configuration of a pixel array unit of an image sensor according to a seventh embodiment.

FIG. 11 is a diagram illustrating a configuration of a pixel array unit PA7 of an image sensor IS7 according to the seventh embodiment. The present embodiment is different from the fifth embodiment in that an anomalous pixel UPX2F provided in the green pixel block PB2 detects light of all the colors assigned to a plurality of the pixel blocks PB. Hereinafter, the difference from the fifth embodiment will be mainly described.

The green pixel block PB2 includes, for example, one anomalous pixel UPX2F. The anomalous pixel UPX2F is located, for example, at the center of the green pixel block PB2. The anomalous pixel UPX2F detects, for example, light of all the colors assigned to a plurality of pixel blocks PB. The light detected by the anomalous pixel UPX2F is white light including colors of red, green, and blue. The number of the anomalous pixels UPX2F included in one green pixel block PB2 may be two or more.

The anomalous pixel UPX2F detects light of three colors. Therefore, for example, the signal processor SA estimates each of the color values of three colors detected by the anomalous pixel UPX2F by using the color information of the pixels PX around the anomalous pixel UPX2F. For example, the signal processor SA estimates the color value of green to be detected by the anomalous pixel UPX2F based on the detection value of the pixel PX other than the anomalous pixel UPX2F in the green pixel block PB2. The signal processor SA subtracts the estimated color value of green from the detection value (including the color value of red, the color value of green, and the color value of blue) of the anomalous pixel UPX2F. According to this, a value of the sum of the color value of red and the color value of blue in the anomalous pixel UPX2F is estimated.

A method of estimating the color value of red and the color value of blue based on the value of the sum of the color value of red and the color value of blue is the same as that described in the fifth embodiment.

In the present embodiment, the following effects are obtained in addition to the effects of the fifth embodiment. The anomalous pixel UPX2F detects, for example, light of all the colors assigned to a plurality of pixel blocks PB. Therefore, the high sensitivity is obtained in the binning mode.

[9. Image Sensor According to Eighth Embodiment]

Figure 12:
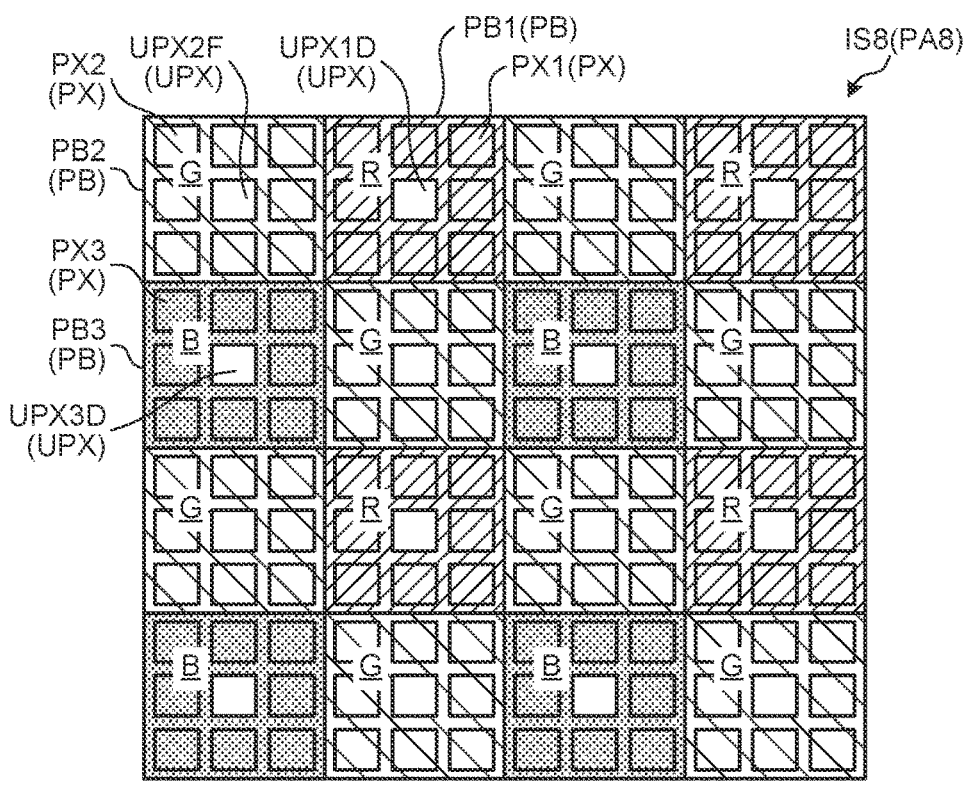
FIG. 12 is a diagram illustrating a configuration of a pixel array unit of an image sensor according to an eighth embodiment.

FIG. 12 is a diagram illustrating a configuration of a pixel array unit PA8 of an image sensor IS8 according to the eighth embodiment. The present embodiment is different from the seventh embodiment in that the anomalous pixels UPX provided in all the pixel blocks PB detect light of all the colors assigned to a plurality of the pixel blocks PB. Hereinafter, the difference from the seventh embodiment will be mainly described.

The red pixel block PB1 includes, for example, one anomalous pixel UPX1D. The anomalous pixel UPX1D is located, for example, at the center of the red pixel block PB1. The anomalous pixel UPX1D detects, for example, light of all the colors assigned to a plurality of pixel blocks PB. The light detected by the anomalous pixel UPX1D is white light including colors of red, green, and blue. The number of the anomalous pixels UPX1D included in one red pixel block PB1 may be two or more.

The blue pixel block PB3 includes, for example, one anomalous pixel UPX3D. The anomalous pixel UPX3D is located, for example, at the center of the blue pixel block PB3. The anomalous pixel UPX3D detects, for example, light of all the colors assigned to a plurality of pixel blocks PB. The light detected by the anomalous pixel UPX3D is white light including colors of red, green, and blue. The number of the anomalous pixels UPX3D included in one blue pixel block PB3 may be two or more.

For example, the signal processor SA estimates each of the color values of three colors detected by the anomalous pixel UPX1D by using the color information of the pixels PX around the anomalous pixel UPX1D. For example, the signal processor SA estimates each of the color values of three colors detected by the anomalous pixel UPX3D by using the color information of the pixels PX around the anomalous pixel UPX3D. The estimation method is the same as that described in the seventh embodiment.

In the present embodiment, the following effects are obtained in addition to the effects of the seventh embodiment. The anomalous pixels UPX provided in all the pixel blocks PB detect light of all the colors assigned to a plurality of the pixel blocks PB. Therefore, the higher sensitivity is obtained in the binning mode.

Figures 13, 14:
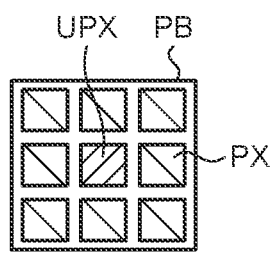
FIG. 13 is a diagram illustrating a comparison result of variations of a pixel array unit.
FIG. 14 is a diagram illustrating a variation of arrangement of an anomalous pixel.

FIG. 13 is a diagram illustrating a comparison result of variations of the pixel array unit PA described above.

In FIG. 13, "Single color" indicates a configuration in which the anomalous pixel UPX selectively detects light of one color. "Complementary color" indicates a configuration in which the anomalous pixel UPX detects light of a plurality of colors assigned to all the pixel blocks PB other than the pixel block PB to which the anomalous pixel UPX belongs. "Original+one color" indicates a configuration in which the anomalous pixel UPX detects light of a color assigned to the pixel block PB to which the anomalous pixel UPX belongs and light of a color assigned to another pixel block PB to which the anomalous pixel UPX does not belong. "White" indicates a configuration in which the anomalous pixel UPX detects light of all the colors assigned to a plurality of the pixel blocks PB.

The numerical values (1, 2, 3, and 4) described in a table of FIG. 13 indicate the order of performance of each configuration. A configuration with a numerical value of 1 provides the best performance. As illustrated in FIG. 13, the resolution of red and blue is the highest in the configuration of "Single color". The sensitivity in the binning mode is highest in the configuration of "White". The color reproducibility in the binning mode is the best in the configuration of "Original+one color".

[10. Variation of Arrangement of Anomalous Pixel]

FIGS. 14 to 18 are diagrams illustrating a variation of arrangement of the anomalous pixel UPX.

FIG. 14 illustrates an example in which one anomalous pixel UPX is disposed at the center of the pixel block PB. One pixel PX at the center of nine pixels PX arranged in three rows and three columns is the anomalous pixel UPX.

Figure 15:
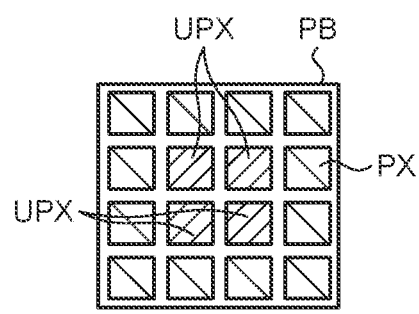
FIG. 15 is a diagram illustrating a variation of arrangement of an anomalous pixel.

FIG. 15 illustrates an example in which four anomalous pixels UPX are disposed to be adjacent to each other at the center of the pixel block PB. Four pixels PX arranged in two rows and two columns at the center of 16 pixels PX arranged in four rows and four columns are the anomalous pixels UPX.

Figure 16:
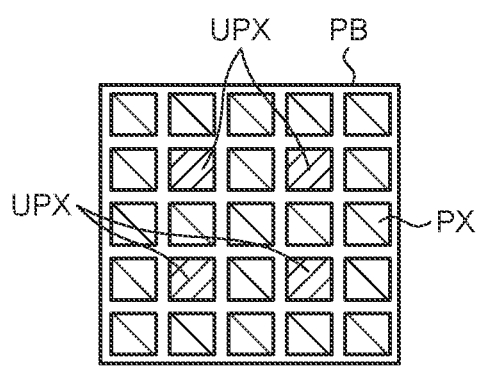
FIG. 16 is a diagram illustrating a variation of arrangement of an anomalous pixel.

FIG. 16 illustrates an example in which four anomalous pixels UPX are disposed not to be adjacent to each other at the center of the pixel block PB. Four anomalous pixels UPX are arranged at rotationally symmetric positions with respect to the center of the pixel block PB.

In the examples of FIGS. 14 to 16, one or more anomalous pixels UPX are located at the center of the pixel block PB. Therefore, the color information of each pixel PX is accurately calculated by the demosaic processing.

Figure 17:
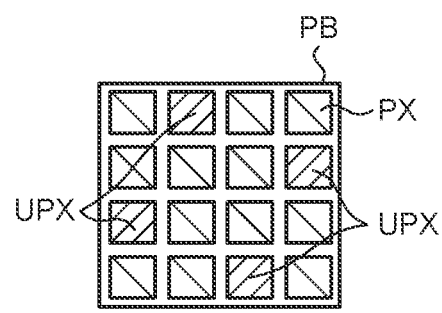
FIG. 17 is a diagram illustrating a variation of arrangement of an anomalous pixel.
Figure 18:
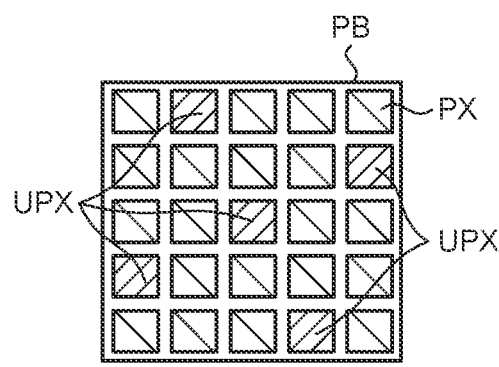
FIG. 18 is a diagram illustrating a variation of arrangement of an anomalous pixel.

FIGS. 17 and 18 are examples in which the pixel block PB includes one or more anomalous pixels UPX in each row and each column.

In the example of FIG. 17, four pixels PX located in the outermost peripheral portion of the pixel block PB including 16 pixels PX arranged in four rows and four columns are the anomalous pixels UPX. Four pixels UPX are arranged at rotationally symmetric positions with respect to the center of the pixel block PB.

In the example of FIG. 18, one pixel PX located at the center of the pixel block PB and four pixels PX located in the outermost peripheral portion of the pixel block PB, the pixel block PB including 25 pixels PX arranged in five rows and five columns, are the anomalous pixels UPX. Five anomalous pixels UPX are arranged at rotationally symmetric positions with respect to the center of the pixel block PB.

In the examples of FIGS. 17 and 18, since one or more anomalous pixels UPX are provided in each row and each column of the pixel block PB, the color sampling interval is reduced.

In the examples of FIGS. 14 to 18, the number of pixels PX constituting the pixel block PB is 9, 16, or 25. However, the number of pixels PX constituting the pixel block PB is not limited thereto.

[11. Another Variation of Pixel Array Unit]

FIGS. 19 to 26 are diagrams illustrating other variations of the pixel array unit PA.

Figure 19:
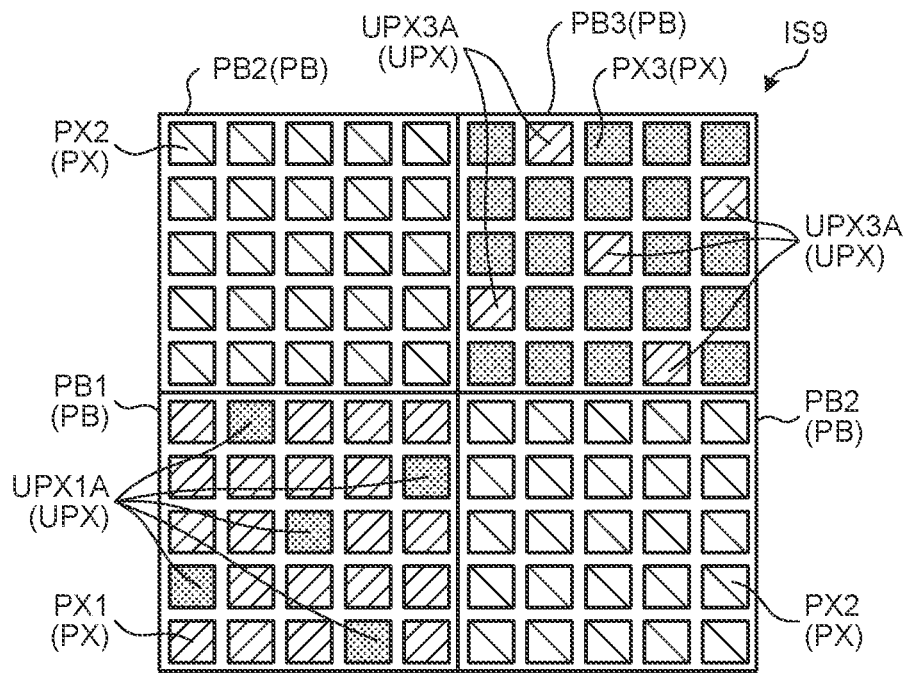
FIG. 19 is a diagram illustrating another variation of a pixel array unit.
Figure 20:
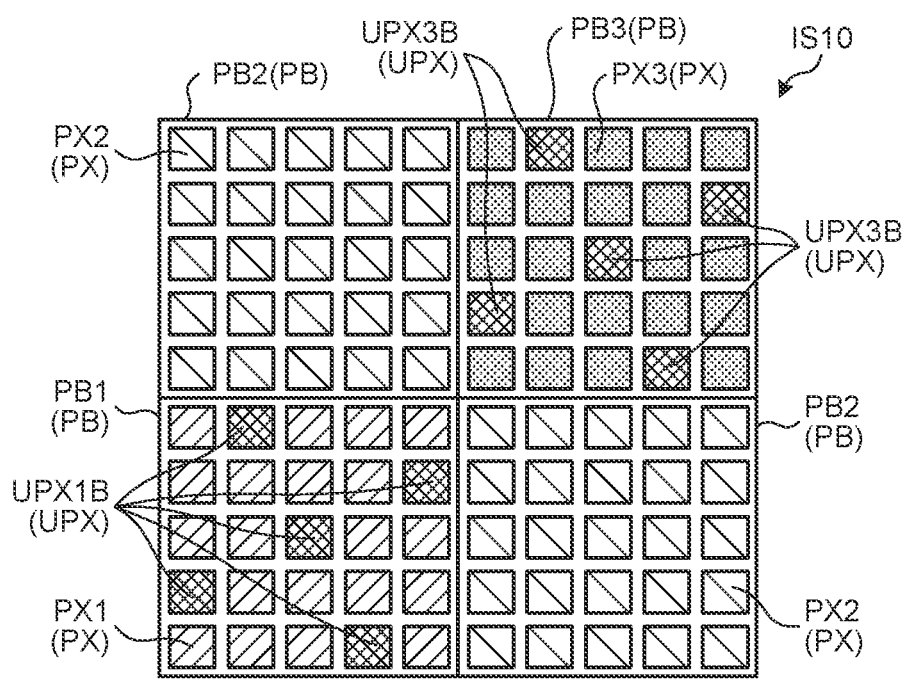
FIG. 20 is a diagram illustrating still another variation of a pixel array unit.
Figure 21:
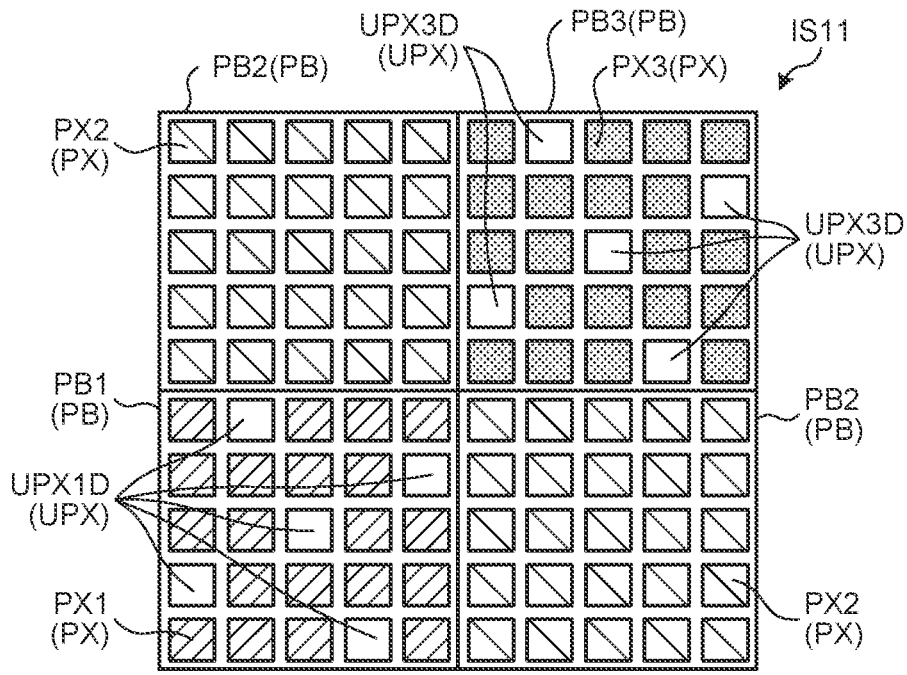
FIG. 21 is a diagram illustrating still another variation of a pixel array unit.

The examples of FIGS. 19 to 21 are examples in which the colors of light detected by a plurality of the anomalous pixels UPX belonging to the same pixel block PB are all the same.

For example, an image sensor IS9 in FIG. 19 is an example in which the arrangement of the anomalous pixel UPX in FIG. 18 is applied to the configuration of the first embodiment. An image sensor IS10 in FIG. 20 is an example in which the arrangement of the anomalous pixel UPX in FIG. 18 is applied to the configuration of the third embodiment. An image sensor IS11 in FIG. 21 is an example in which the arrangement of the anomalous pixel UPX in FIG. 18 is applied to the configuration of the eighth embodiment. In the example of FIG. 21, unlike the eighth embodiment, the green pixel block PB2 does not include the anomalous pixel UPX.

In the examples of FIGS. 19 to 21, the pixel block PB includes one or more anomalous pixels UPX in each row and each column. Therefore, the sampling intervals for the colors are reduced.

The examples of FIGS. 22 to 26 are examples in which a plurality of types of anomalous pixels UPX that detect light of different colors is included in the same pixel block PB.

Figure 22:
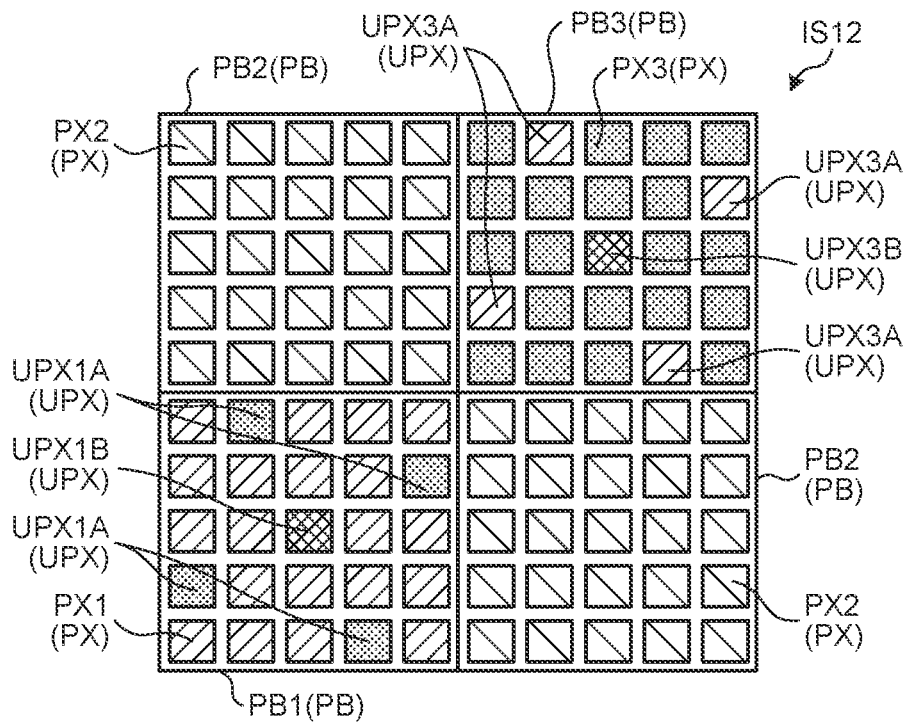
FIG. 22 is a diagram illustrating still another variation of a pixel array unit.

For example, an image sensor IS12 in FIG. 22 is different from the example in FIG. 19 in the following points. That is, the color of light detected by one anomalous pixel UPX located at the center of the pixel block PB is different from the color of light detected by the other four anomalous pixels UPX located in the outermost peripheral portion of the pixel block PB.

For example, the anomalous pixel UPX1A located in the outermost peripheral portion of the red pixel block PB1 detects light of a blue color assigned to the blue pixel block PB3. The anomalous pixel UPX1B located at the center of the red pixel block PB1 detects light of a red color assigned to the red pixel block PB1 and light of a blue color assigned to the blue pixel block PB3. The anomalous pixel UPX3A located in the outermost peripheral portion of the blue pixel block PB3 detects light of a red color assigned to the red pixel block PB1. The anomalous pixel UPX3B located at the center of the blue pixel block PB3 detects light of a red color assigned to the red pixel block PB1 and light of a blue color assigned to the blue pixel block PB3. The demosaic processing method is the same as that described in the first embodiment and the third embodiment.

In this configuration, the following effects are obtained in addition to the effects indicated in the example of FIG. 19. The anomalous pixel UPX located at the center of the pixel block PB detects light of two or more colors. Therefore, the sampling intervals for two or more colors are reduced. The sensitivity in the binning mode is also increased. Furthermore, the anomalous pixel UPX located at the center of the pixel block PB detects light of two or more colors including the color assigned to the pixel block PB to which the anomalous pixel UPX belongs. Therefore, the color reproducibility in the normal mode is high.

Figure 23:
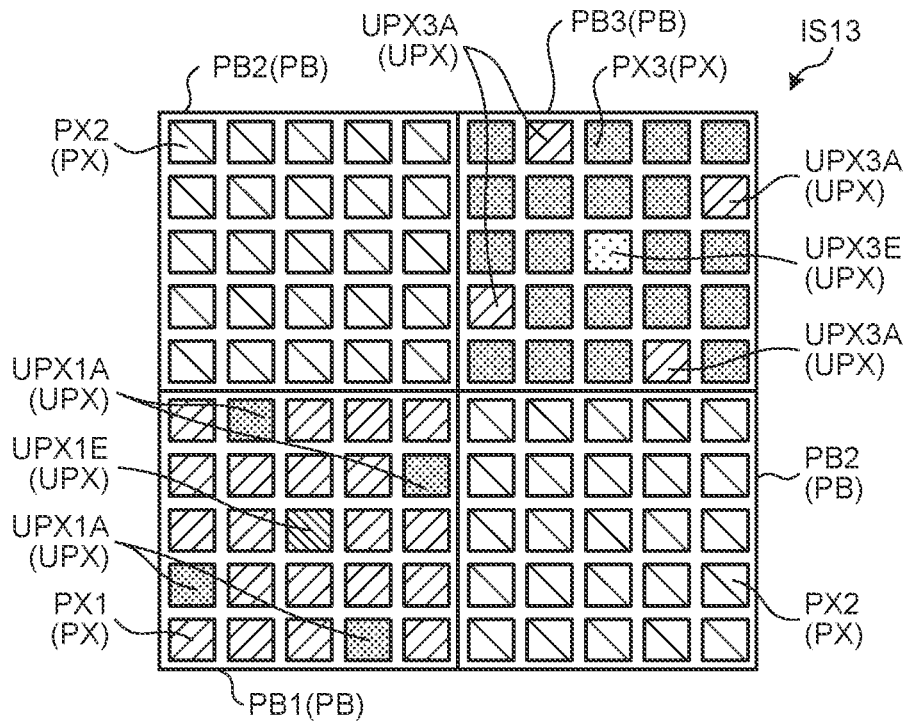
FIG. 23 is a diagram illustrating still another variation of a pixel array unit.
Figure 24:
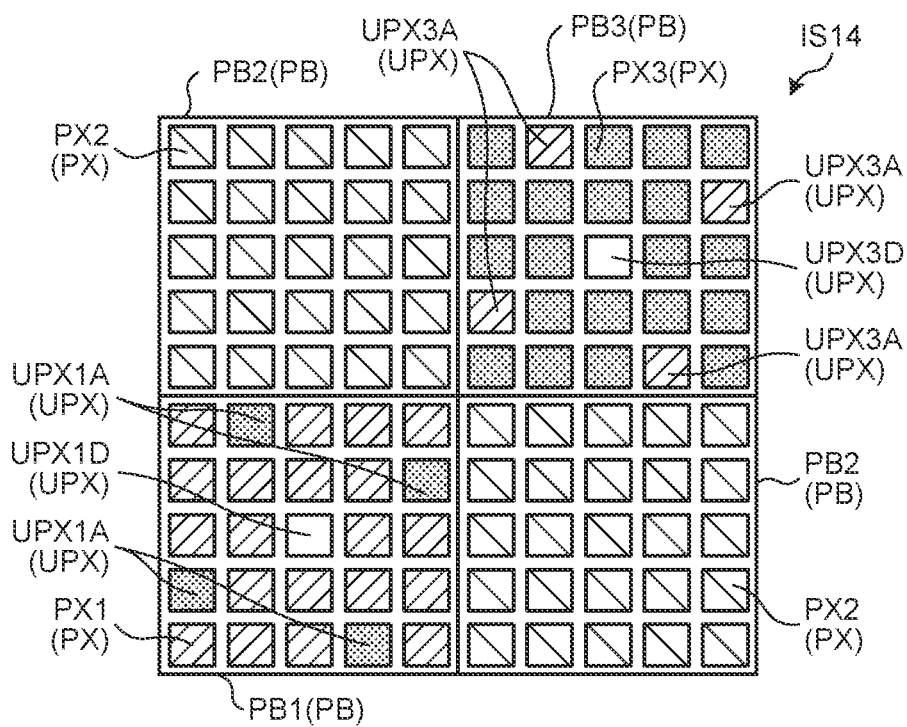
FIG. 24 is a diagram illustrating still another variation of a pixel array unit.

An image sensor IS13 of FIG. 23 and an image sensor IS14 of FIG. 24 are different from the example of FIG. 22 in that the color of light detected by the anomalous pixel UPX located at the center of the pixel block PB is different.

For example, in the example of FIG. 23, an anomalous pixel UPX1E located at the center of the red pixel block PB1 detects light of a red color assigned to the red pixel block PB1 and light of a green color assigned to the green pixel block PB2. An anomalous pixel UPX3E located at the center of the blue pixel block PB3 detects light of a green color assigned to the green pixel block PB2 and light of a blue color assigned to the blue pixel block PB3. In the example of FIG. 24, the anomalous pixel UPX1D located at the center of the red pixel block PB1 detects light of all the colors assigned to a plurality of the pixel blocks PB. The anomalous pixel UPX3D located at the center of the blue pixel block PB3 detects light of all the colors assigned to a plurality of the pixel blocks PB. Also in these examples, effects similar to those in the example of FIG. 22 are obtained.

Figure 25:
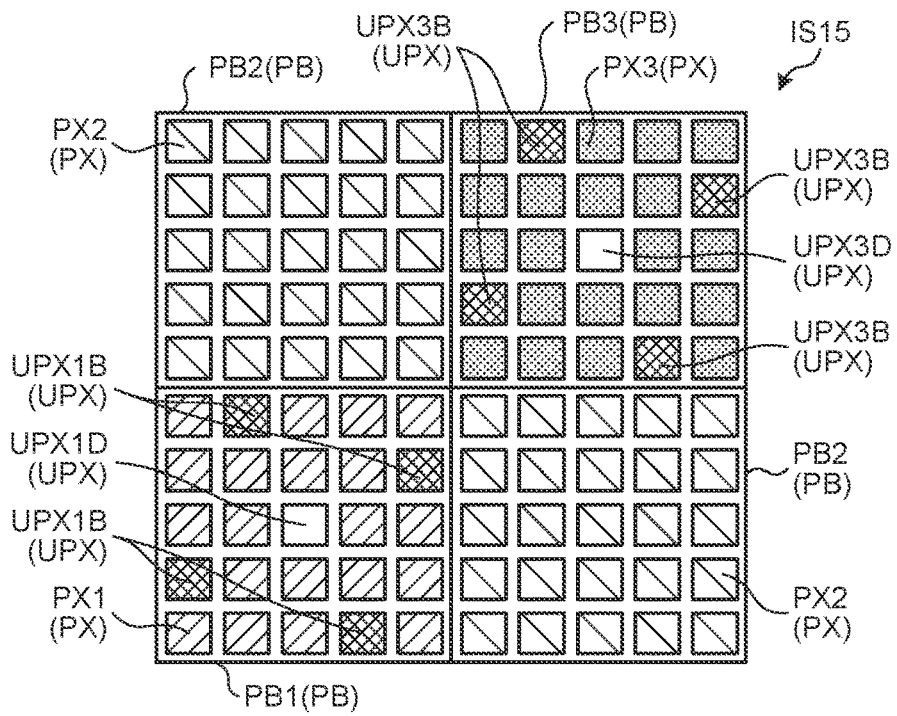
FIG. 25 is a diagram illustrating still another variation of a pixel array unit.

An image sensor IS15 of FIG. 25 is different from the example of FIG. 24 in that the color of light detected by the anomalous pixel UPX located in the outermost peripheral portion of the pixel block PB is different. For example, the anomalous pixel UPX1B located in the outermost peripheral portion of the red pixel block PB1 detects light of a red color assigned to the red pixel block PB1 and light of a blue color assigned to the blue pixel block PB3. The anomalous pixel UPX3B located at the outermost peripheral portion of the blue pixel block PB3 detects light of a red color assigned to the red pixel block PB1 and light of a blue color assigned to the blue pixel block PB3. In this configuration, the anomalous pixel UPX located in the outermost peripheral portion of the pixel block PB also detects light of a plurality of colors in addition to the anomalous pixel UPX located at the center of the pixel block PB. Therefore, the sampling intervals for the colors are reduced.

Figure 26:
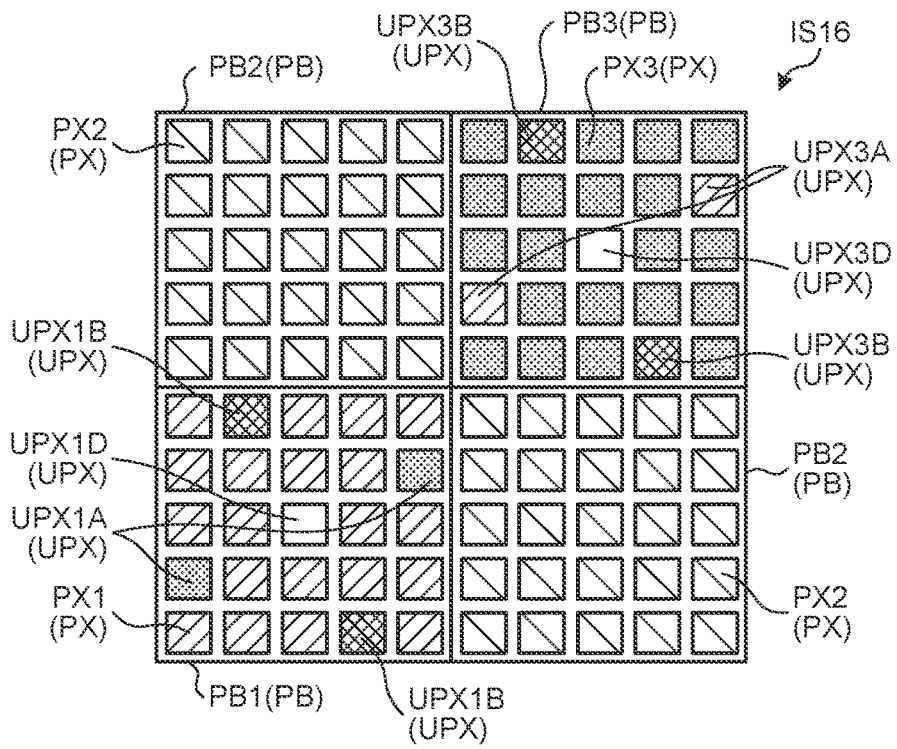
FIG. 26 is a diagram illustrating still another variation of a pixel array unit.

An image sensor IS16 of FIG. 26 is different from the example of FIG. 25 in that a plurality of the anomalous pixels UPX that detect light of different colors is provided in the outermost peripheral portion of the same pixel block PB.

For example, the anomalous pixel UPX1A and anomalous pixel UPX1B, which detect light of colors different from each other, are provided in the outermost peripheral portion of the red pixel block PB1. The anomalous pixel UPX1A detects blue light assigned to the blue pixel block PB3. The anomalous pixel UPX1B detects light of a red color assigned to the red pixel block PB1 and light of a blue color assigned to the blue pixel block PB3. In the red pixel block PB1, two anomalous pixels UPX1A are provided at rotationally symmetric positions with respect to the center of the red pixel block PB1. In the red pixel block PB1, two anomalous pixels UPX1B are provided at rotationally symmetric positions with respect to the center of the red pixel block PB1.

The anomalous pixel UPX3A and anomalous pixel UPX3B, which detect light of colors different from each other, are provided in the outermost peripheral portion of the blue pixel block PB3. The anomalous pixel UPX3A detects red light assigned to the red pixel block PB1. The anomalous pixel UPX3B detects light of a red color assigned to the red pixel block PB1 and light of a blue color assigned to the blue pixel block PB3. In the blue pixel block PB3, two anomalous pixels UPX3A are provided at rotationally symmetric positions with respect to the center of the blue pixel block PB3. In the blue pixel block PB3, two anomalous pixels UPX3B are provided at rotationally symmetric positions with respect to the center of the blue pixel block PB3.

In this configuration, the sampling intervals for colors are reduced.

The effects described in the present specification are merely examples and are not limited, and other effects may be obtained.

Note that, the present technology can also have the following configurations.

(1)

An image sensor comprising a plurality of pixel blocks to which colors different from each other are assigned, wherein the plurality of pixel blocks respectively includes a plurality of pixels, and one or more anomalous pixels that detect light of one or more colors assigned to the other one or more pixel blocks are included in the plurality of pixels provided in at least one pixel block among the plurality of pixel blocks.

(2)

The image sensor according to (1), further comprising a processing circuit that detects a detection value of each of the plurality of pixel blocks as a color value of color assigned to each of the plurality of pixel blocks in a binning mode.

(3)

The image sensor according to (2), wherein in the binning mode, the processing circuit adds detection values of the plurality of pixels in a same pixel block including the one or more anomalous pixels, performs color correction on a total detection value obtained by adding the detection values, and detects the total detection value subjected to the color correction as the color value of color assigned to the pixel block.

(4)

The image sensor according to (2), wherein in the binning mode, the processing circuit adds the detection values of the plurality of pixels in a same pixel block excluding the one or more anomalous pixels, and detects a total detection value obtained by adding the detection values as a color value of color assigned to the pixel block.

(5)

The image sensor according to any one of (1) to (4), wherein the anomalous pixel detects light of two or more colors selected from a plurality of colors assigned to the plurality of pixel blocks.

(6)

The image sensor according to (5), wherein the anomalous pixel selectively detects light of color assigned to the pixel block to which the anomalous pixel belongs and light of one or more colors respectively assigned to one or more pixel blocks to which the anomalous pixel does not belong.

(7)

The image sensor according to (5), wherein the anomalous pixel selectively detects light of two or more colors respectively assigned to two or more pixel blocks to which the anomalous pixel does not belong.

(8)

The image sensor according to (5), wherein the anomalous pixel detects light of all the colors assigned to the plurality of pixel blocks.

(9)

The image sensor according to any one of (5) to (8), further comprising a processing circuit that makes an exposure time of the anomalous pixel shorter than an exposure time of other pixels.

(10)

The image sensor according to any one of (1) to (9), wherein each of the plurality of pixel blocks includes $N^2$ pixels arranged in N rows and N columns (N is an integer greater than or equal to 3).

(11)

The image sensor according to (10), wherein the one or more anomalous pixels are located at a center of the pixel block.

(12)

The image sensor according to (10), wherein the pixel block includes one or more anomalous pixels in each row and each column.

(13)

The image sensor according to any one of (10) to (12), wherein the plurality of pixel blocks includes a red pixel block to which red is assigned, a green pixel block to which green is assigned, and a blue pixel block to which blue is assigned, and the red pixel block, the green pixel block, and the blue pixel block are arranged according to a Bayer array pattern.

(14)

A camera comprising the image sensor according to any one of (1) to (13).

REFERENCE SIGNS LIST

CA CAMERA
IS, IS1 to IS16 IMAGE SENSOR
PB PIXEL BLOCK
PX PIXEL
PR PROCESSING CIRCUIT
UPX, UPX1A to UPX1E, UPX2A to UPX2F, UPX3A to UPX3E ANOMALOUS PIXEL

The invention claimed is:

1. An image sensor, comprising:
a plurality of pixel blocks to which colors different from each other are assigned,
wherein the plurality of pixel blocks respectively includes a plurality of pixels, and
one or more anomalous pixels configured to detect light of at least one color assigned to the other one or more pixel blocks are included in the plurality of pixels provided in at least one pixel block among the plurality of pixel blocks, wherein an anomalous pixel of the one or more anomalous pixels is configured to selectively detect light of color assigned to the pixel block to which the anomalous pixel belongs and light of one or more colors respectively assigned to one or more pixel blocks to which the anomalous pixel does not belong.

2. The image sensor according to claim 1, further comprising a processing circuit configured to detect a detection value of each of the plurality of pixel blocks as a color value of color assigned to each of the plurality of pixel blocks in a binning mode.

3. The image sensor according to claim 2, wherein in the binning mode, the processing circuit is further configured to:
add detection values of the plurality of pixels in a same pixel block including the one or more anomalous pixels;
perform color correction on a total detection value obtained by addition of the detection values; and
detect the total detection value subjected to the color correction as the color value of color assigned to the pixel block.

4. The image sensor according to claim 2, wherein in the binning mode, the processing circuit is further configured to:
add the detection values of the plurality of pixels in a same pixel block excluding the one or more anomalous pixels, and
detect a total detection value obtained by addition of the detection values as a color value of color assigned to the pixel block.

5. The image sensor according to claim 1, wherein the anomalous pixel is configured to detect light of two or more colors selected from a plurality of colors assigned to the plurality of pixel blocks.

6. The image sensor according to claim 5, further comprising a processing circuit further configured to make an exposure time of the anomalous pixel shorter than an exposure time of other pixels.

7. The image sensor according to claim 1, wherein each of the plurality of pixel blocks includes N2 pixels arranged in N rows and N columns (N is an integer greater than or equal to 3).

8. The image sensor according to claim 7, wherein the one or more anomalous pixels are located at a center of the pixel block.

9. The image sensor according to claim 7, wherein the pixel block includes the one or more anomalous pixels in each row and each column.

10. The image sensor according to claim 7, wherein
the plurality of pixel blocks includes a red pixel block to which red is assigned, a green pixel block to which green is assigned, and a blue pixel block to which blue is assigned, and
the red pixel block, the green pixel block, and the blue pixel block are arranged according to a Bayer array pattern.

11. A camera comprising the image sensor according to claim 1.

12. An image sensor, comprising:
a plurality of pixel blocks to which colors different from each other are assigned,
wherein the plurality of pixel blocks respectively includes a plurality of pixels, and
one or more anomalous pixels configured to detect light of at least one color assigned to the other one or more pixel blocks are included in the plurality of pixels provided in at least one pixel block among the plurality of pixel blocks, wherein an anomalous pixel of the one or more anomalous pixels is further configured to selectively detect light of two or more colors respectively assigned to two or more pixel blocks to which the anomalous pixel does not belong.

\* \* \* \* \*